(12) United States Patent
Yoshitomi et al.

(10) Patent No.: US 10,599,296 B2
(45) Date of Patent: Mar. 24, 2020

(54) MENU DISPLAY APPARATUS, MENU DISPLAY METHOD AND PROGRAM

(71) Applicant: SONY CORPORATION, Tokyo (JP)

(72) Inventors: Kosuke Yoshitomi, Kanagawa (JP);
Daisuke Nakata, Kanagawa (JP);
Takeo Tsukamoto, Tokyo (JP);
Katsuya Hyodo, Kanagawa (JP);
Junichirou Sakata, Tokyo (JP);
Shoichiro Moriya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 205 days.

(21) Appl. No.: 15/861,154

(22) Filed: Jan. 3, 2018

(65) Prior Publication Data

US 2018/0129382 A1    May 10, 2018

Related U.S. Application Data

(63) Continuation of application No. 14/525,873, filed on Oct. 28, 2014, now Pat. No. 9,898,163, which is a (Continued)

(30) Foreign Application Priority Data

Apr. 15, 2009    (JP) ................. 2009-099145

(51) Int. Cl.
*G06F 3/048*    (2013.01)
*G06F 3/0482*    (2013.01)
(Continued)

(52) U.S. Cl.
CPC .......... *G06F 3/0482* (2013.01); *G06F 3/0486* (2013.01); *G06F 3/04817* (2013.01);
(Continued)

(58) Field of Classification Search
CPC .............. G06F 3/0482; G06F 3/04817; G06F 3/04842; G06F 3/0486; G06F 3/04883
(Continued)

(56) References Cited

U.S. PATENT DOCUMENTS 5,977,974 A    11/1999  Hatori et al.
7,076,505 B2    7/2006  Campbell
(Continued)

FOREIGN PATENT DOCUMENTS

JP    06-290014    10/1994
JP    11-65806    3/1999
(Continued)

OTHER PUBLICATIONS

Aug. 21, 2018, European Search Report issued for related EP application No. 18170213.5.
(Continued)

*Primary Examiner* — David Phantana-angkool
(74) *Attorney, Agent, or Firm* — Paratus Law Group, PLLC

(57) ABSTRACT

Provided is a menu display apparatus that displays a menu of a plurality of applications, including an acquisition unit that acquires display data of content information representing content to be displayed in the menu of the content managed by each application from each application and a display controller that controls a display of the content information in each area according to setting conditions for the area provided for each of the applications in the menu and the display information of the content information acquired from each application. Accordingly, the display of the content information to be displayed in the menu in each area is controlled according to setting conditions for the area provided for each application in the menu and display data of the content information acquired from each application.

18 Claims, 17 Drawing Sheets

Related U.S. Application Data continuation of application No. 13/263,377, filed as application No. PCT/JP2010/050596 on Jan. 20, 2010, now Pat. No. 8,918,738.

(51) Int. Cl.
  *G06F 3/0486* (2013.01)
  *G06F 3/0488* (2013.01)
  *G06F 3/0481* (2013.01)
  *G06F 3/0484* (2013.01)

(52) U.S. Cl.
  CPC ...... *G06F 3/04842* (2013.01); *G06F 3/04883* (2013.01); *G06F 2203/04803* (2013.01)

(58) Field of Classification Search
  USPC ........................................................ 715/780
  See application file for complete search history.

(56) References Cited

U.S. PATENT DOCUMENTS

| | | | |
|---|---|---|---|
| 7,475,087 | B1 | 1/2009 | Lazo et al. |
| 7,956,847 | B2 | 6/2011 | Christie |
| 8,271,879 | B2 | 9/2012 | Bush |
| 8,533,631 | B2 | 9/2013 | Ha et al. |
| 8,539,387 | B1 | 9/2013 | Lin et al. |
| 8,548,992 | B2 | 10/2013 | Abramoff et al. |
| 8,650,505 | B2 | 2/2014 | Anttila et al. |
| 8,732,593 | B2 | 5/2014 | Van Wie et al. |
| 9,965,165 | B2 * | 5/2018 | Hinckley ............... G06F 3/0488 |
| 10,180,773 | B2 * | 1/2019 | Audet .................... G06Q 10/10 |
| 10,268,367 | B2 * | 4/2019 | Hinckley ............ G06F 3/04817 |
| 10,289,657 | B2 * | 5/2019 | Audet .................... G06F 17/211 |
| 10,372,296 | B2 * | 8/2019 | Hatada .................. G06F 3/0486 |
| D861,720 | S * | 10/2019 | Koller .......................... D14/486 |
| 2005/0024341 | A1 | 2/2005 | Gillespie et al. |
| 2008/0122796 | A1 | 5/2008 | Jobs et al. |
| 2009/0055413 | A1 * | 2/2009 | Audet ................... G06T 11/206 |
| 2010/0030868 | A1 | 2/2010 | Okamoto et al. |
| 2011/0072492 | A1 | 3/2011 | Mohler et al. |
| 2012/0084352 | A1 | 4/2012 | Cho et al. |
| 2012/0117492 | A1 | 5/2012 | Aggarwal et al. |
| 2012/0198385 | A1 * | 8/2012 | Audet ................... G06F 3/0482 715/821 |
| 2013/0290897 | A1 * | 10/2013 | Audet ................... G06F 3/0482 715/784 |
| 2016/0092043 | A1 * | 3/2016 | Missig .................. G06F 3/0482 715/811 |
| 2016/0370958 | A1 * | 12/2016 | Tsuji ..................... G06F 3/0488 |
| 2016/0378318 | A1 * | 12/2016 | Tsuju ................... G06F 3/0488 715/835 |
| 2018/0129382 | A1 * | 5/2018 | Yoshitomi ............. G06F 3/0482 |

FOREIGN PATENT DOCUMENTS

| | | |
|---|---|---|
| JP | 2000-276274 | 10/2000 |
| JP | 2008-301377 | 12/2008 |

OTHER PUBLICATIONS

Jan. 28, 2014, Japanese Office Action for related JP application No. 2009-099145.

Apr. 16, 2013, Japanese Office Action issued for related application No. JP2009-099145.

International Search Report from the Japanese Patent Office in International Application No. PCT/JP2010/050596 dated Apr. 27, 2010.

Apr. 29, 2015, EP communication issued for related EP application No. 10764300.9.

* cited by examiner

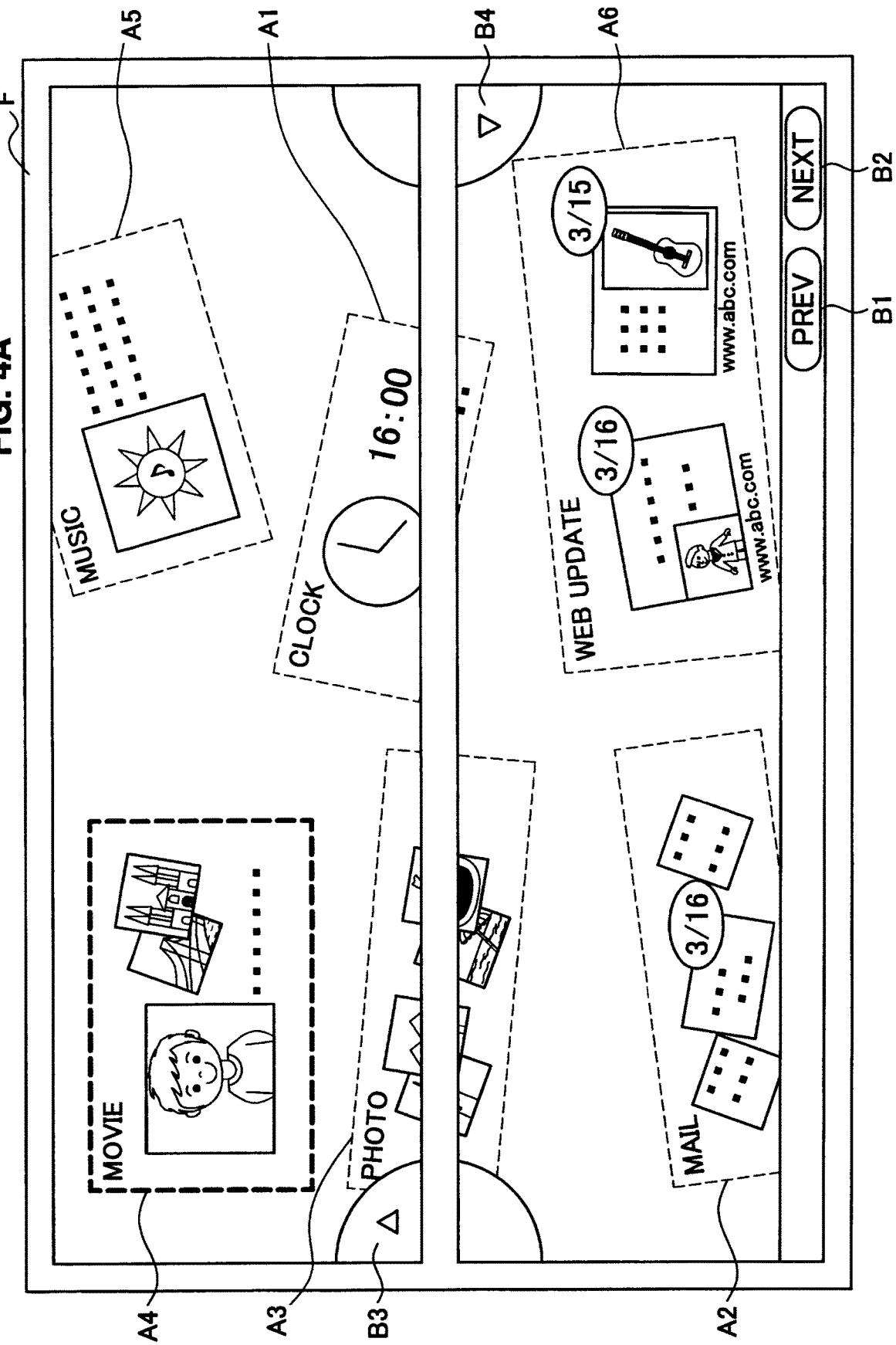

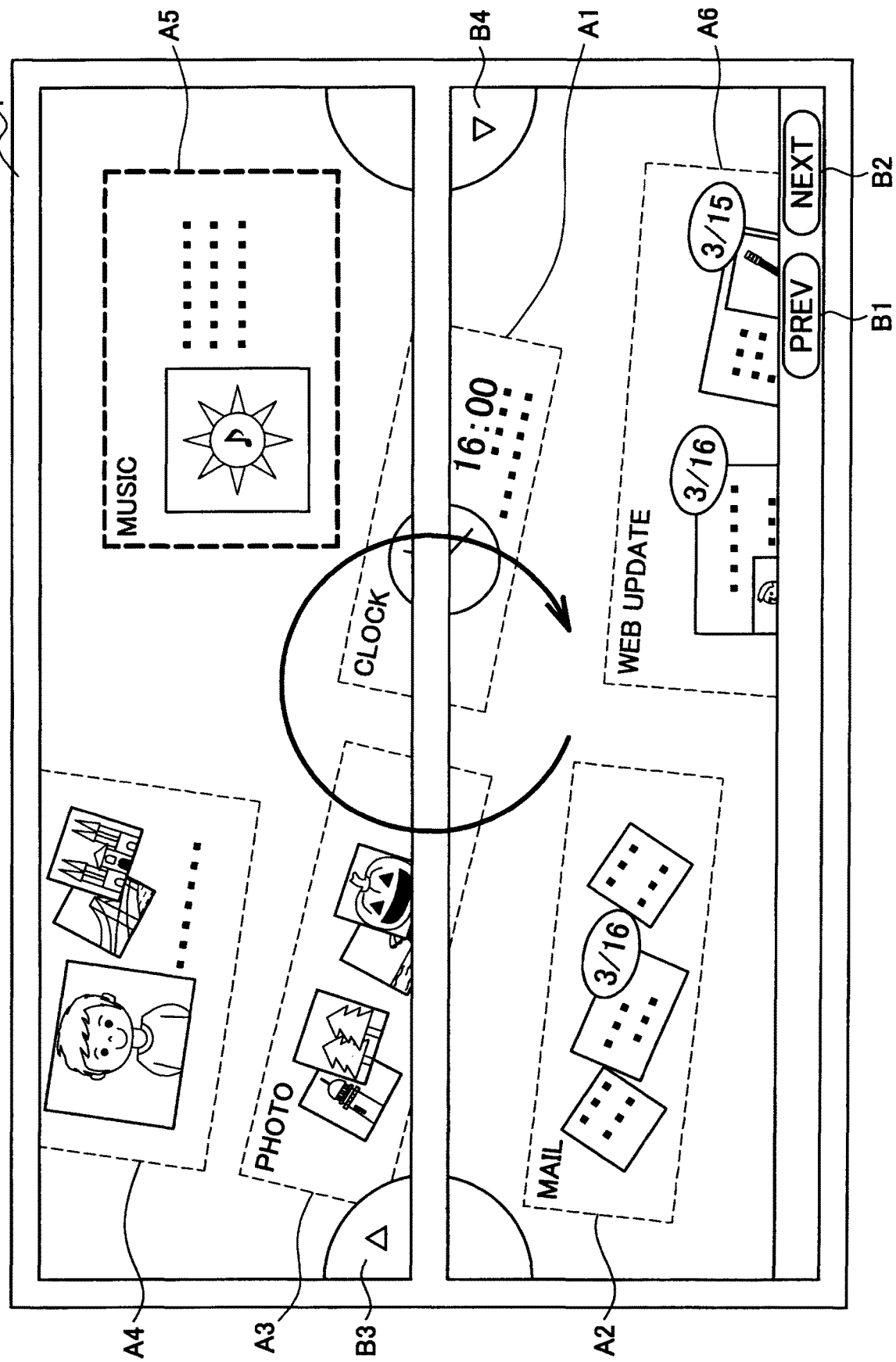

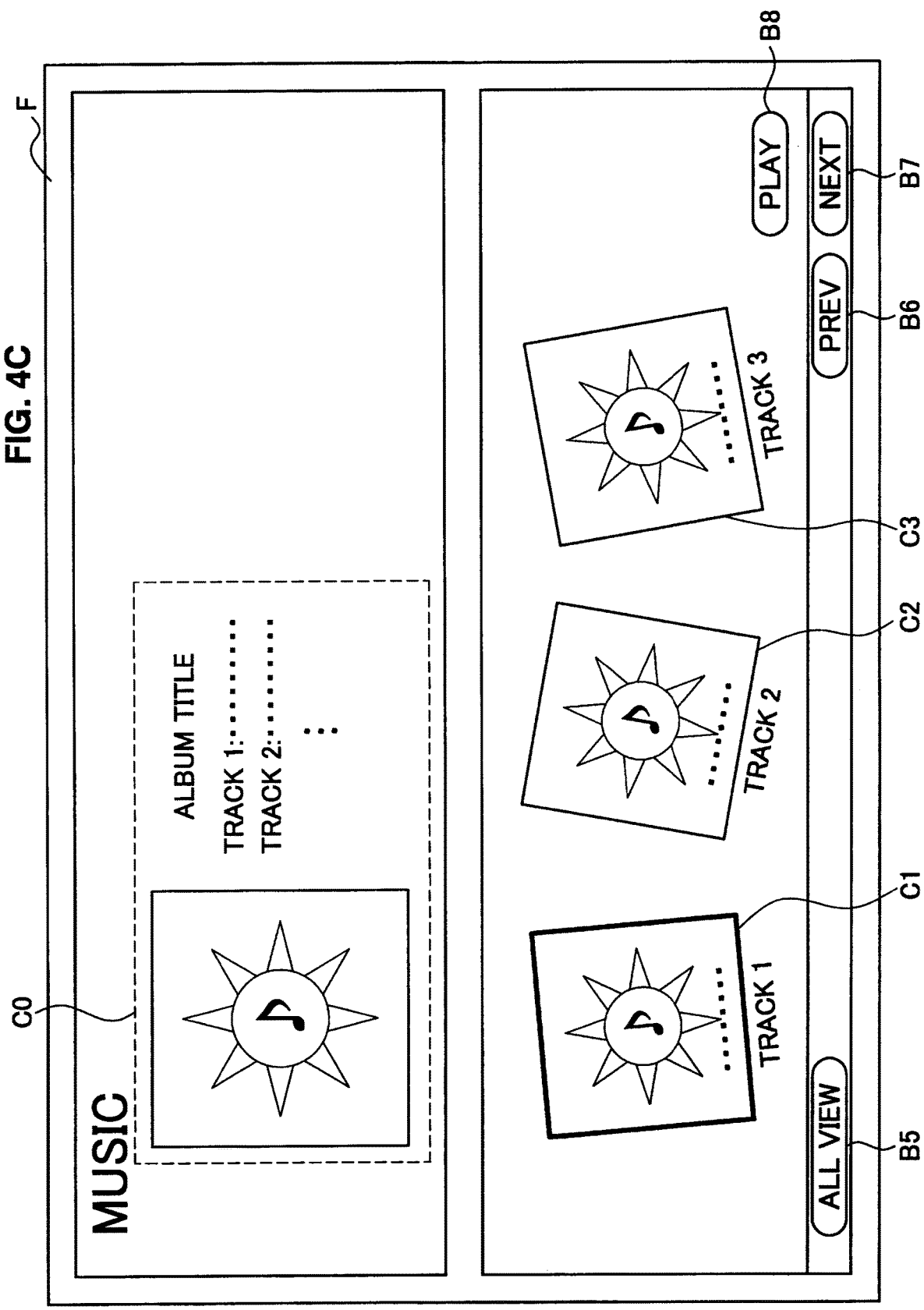

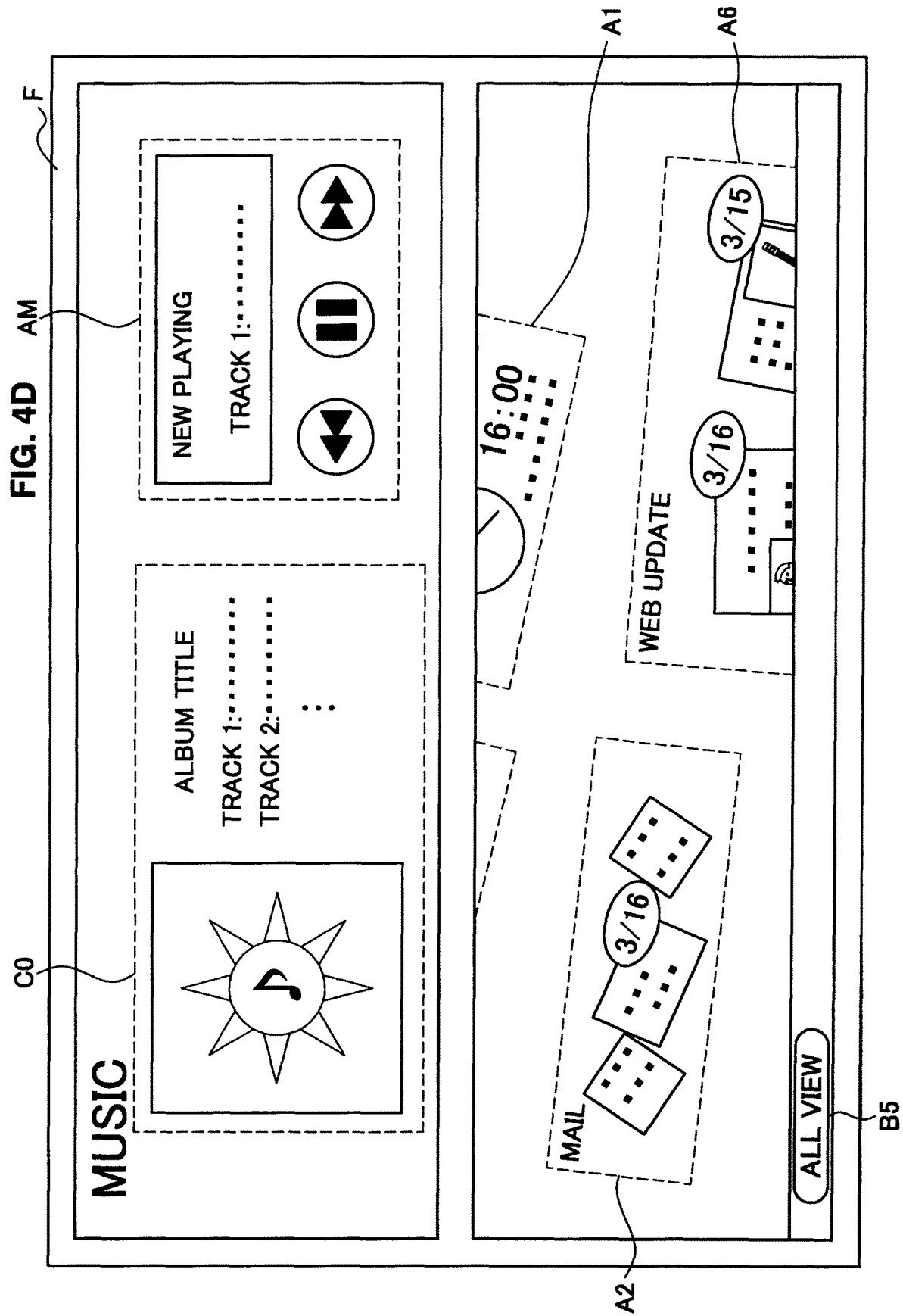

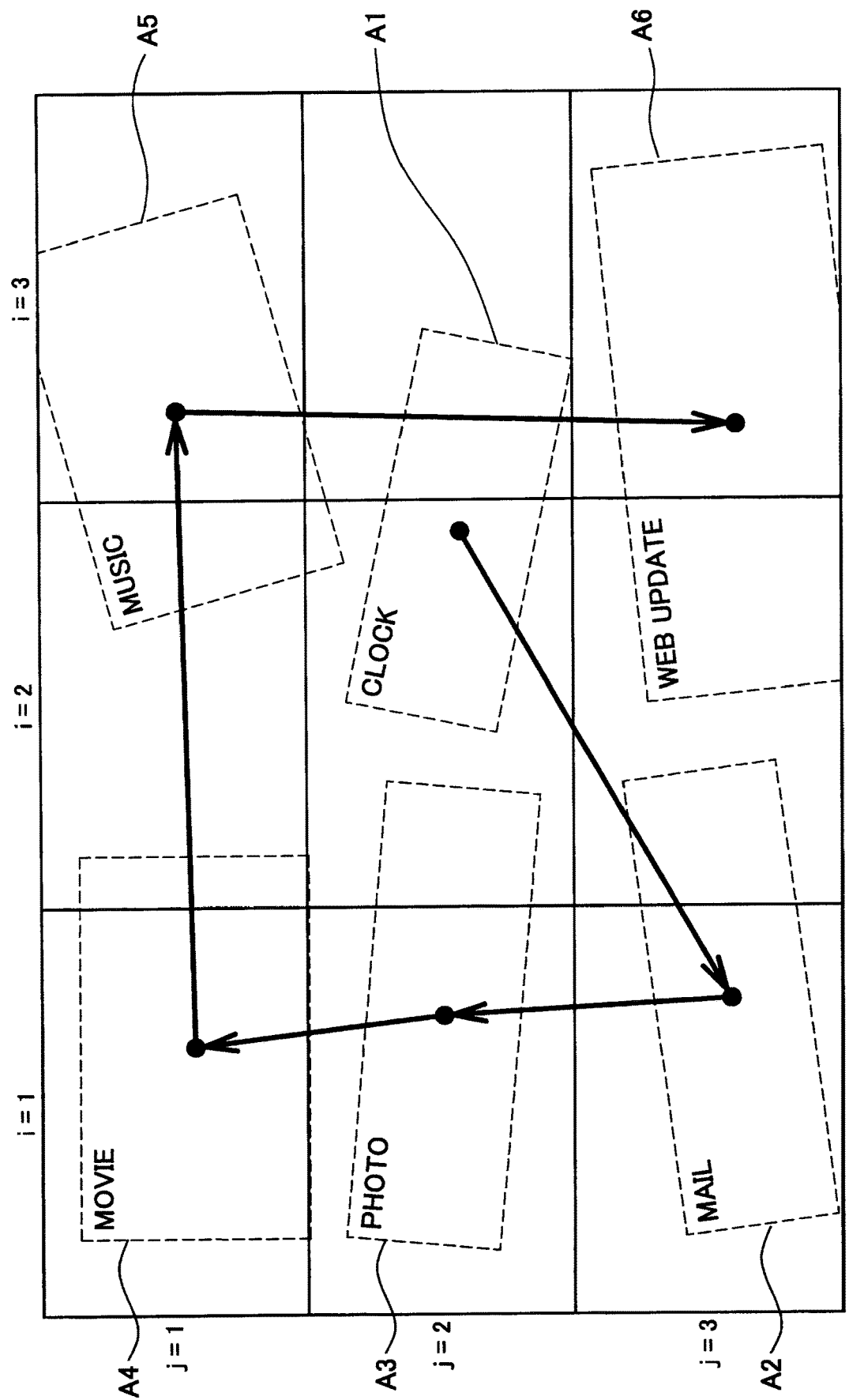

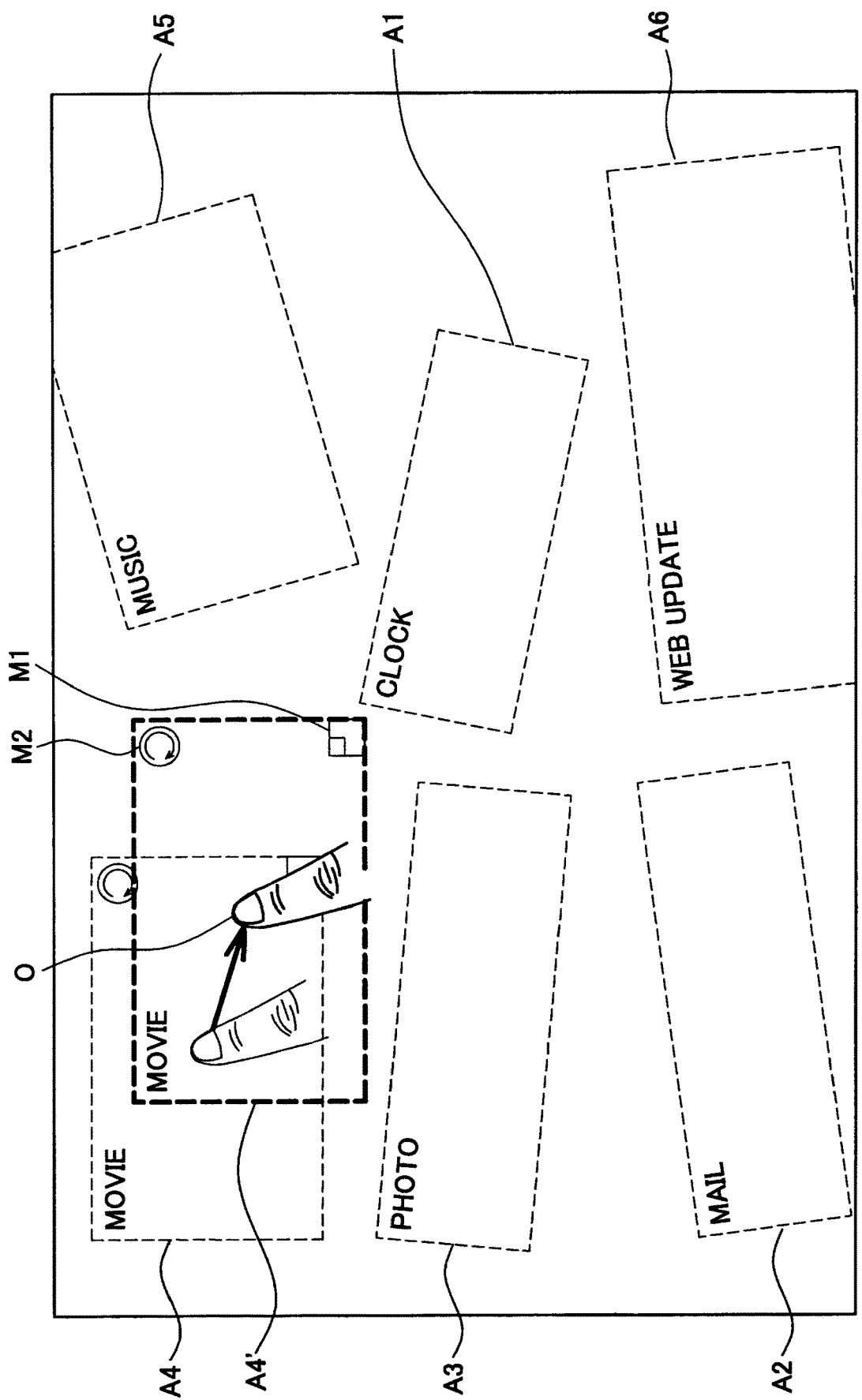

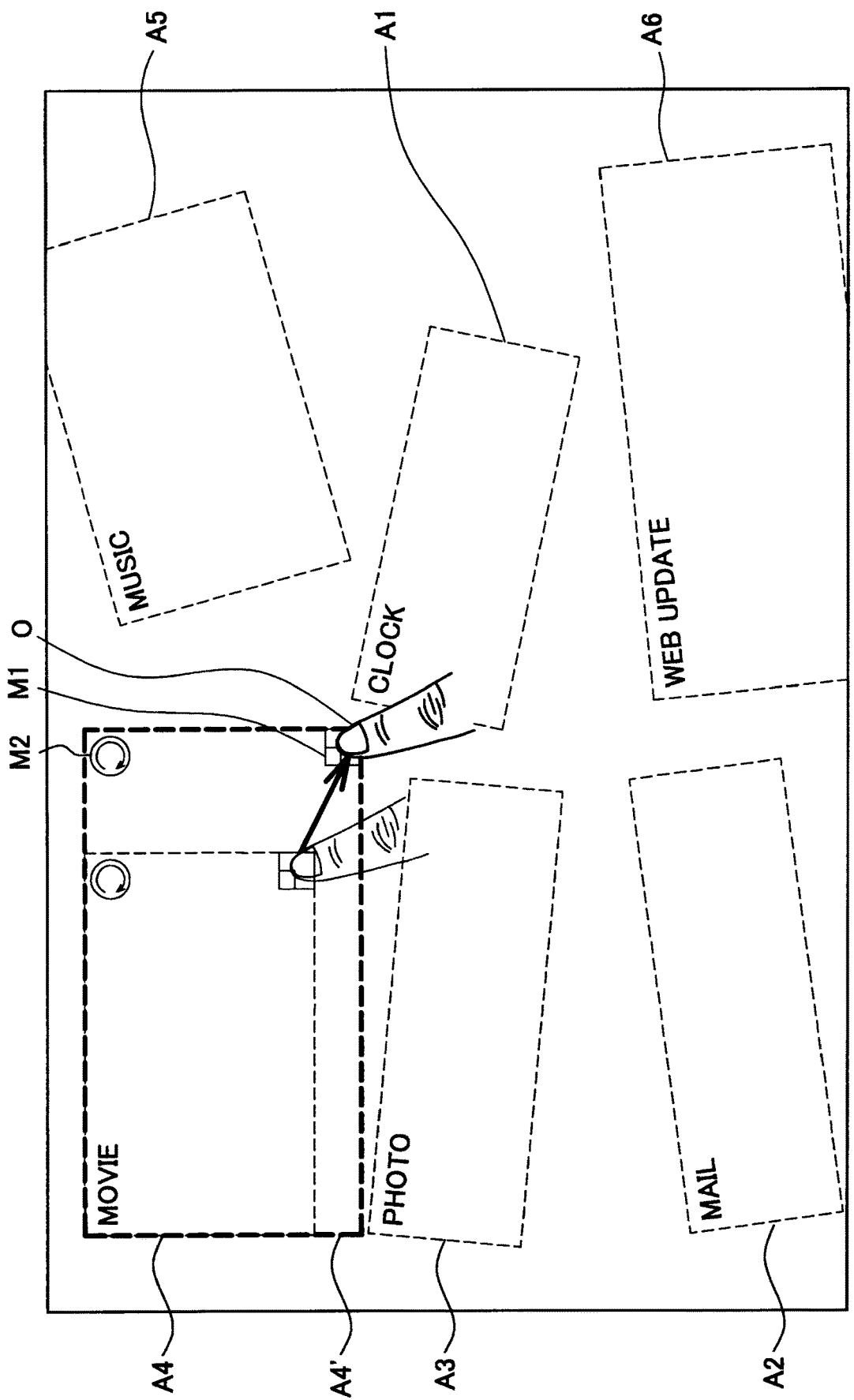

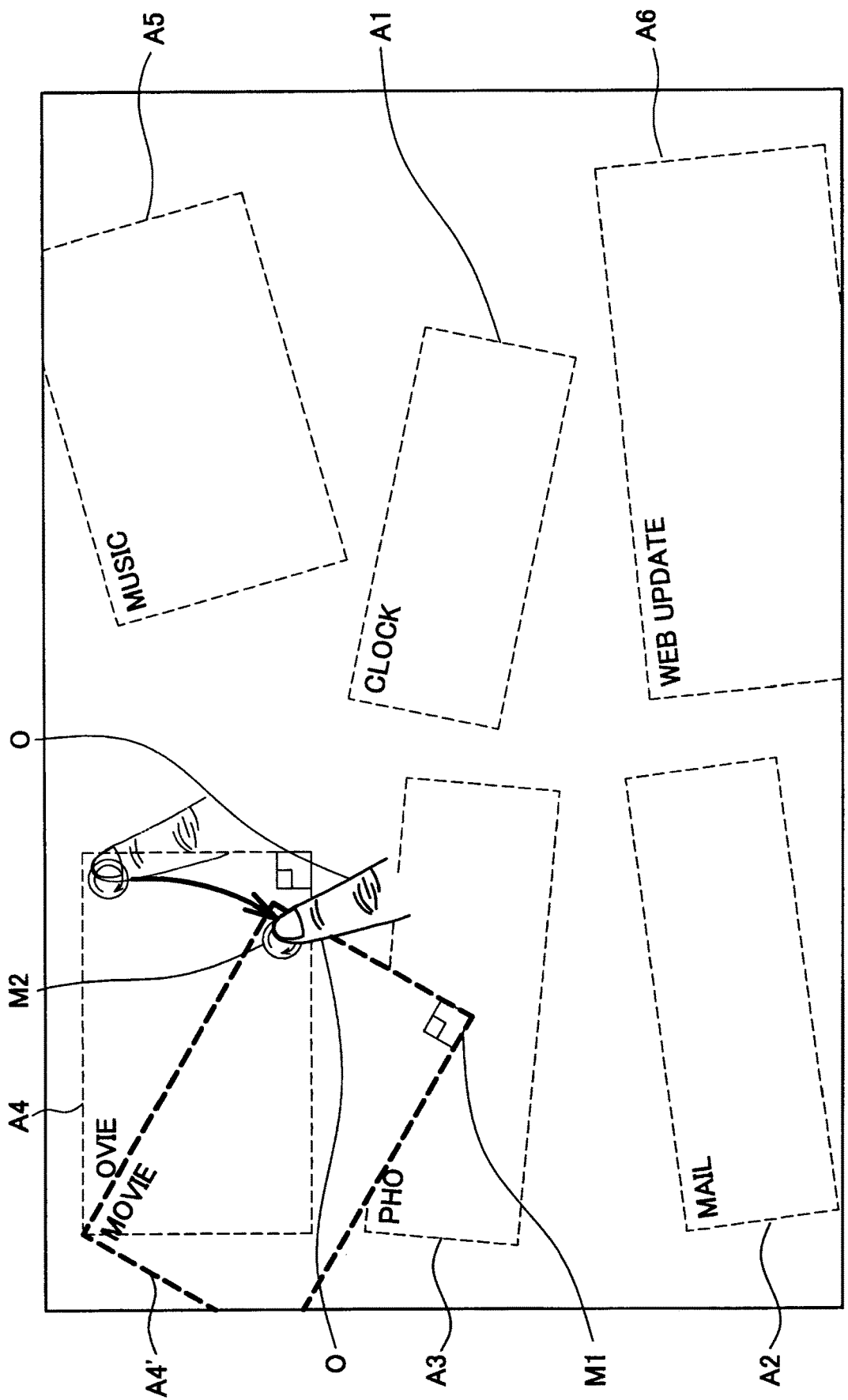

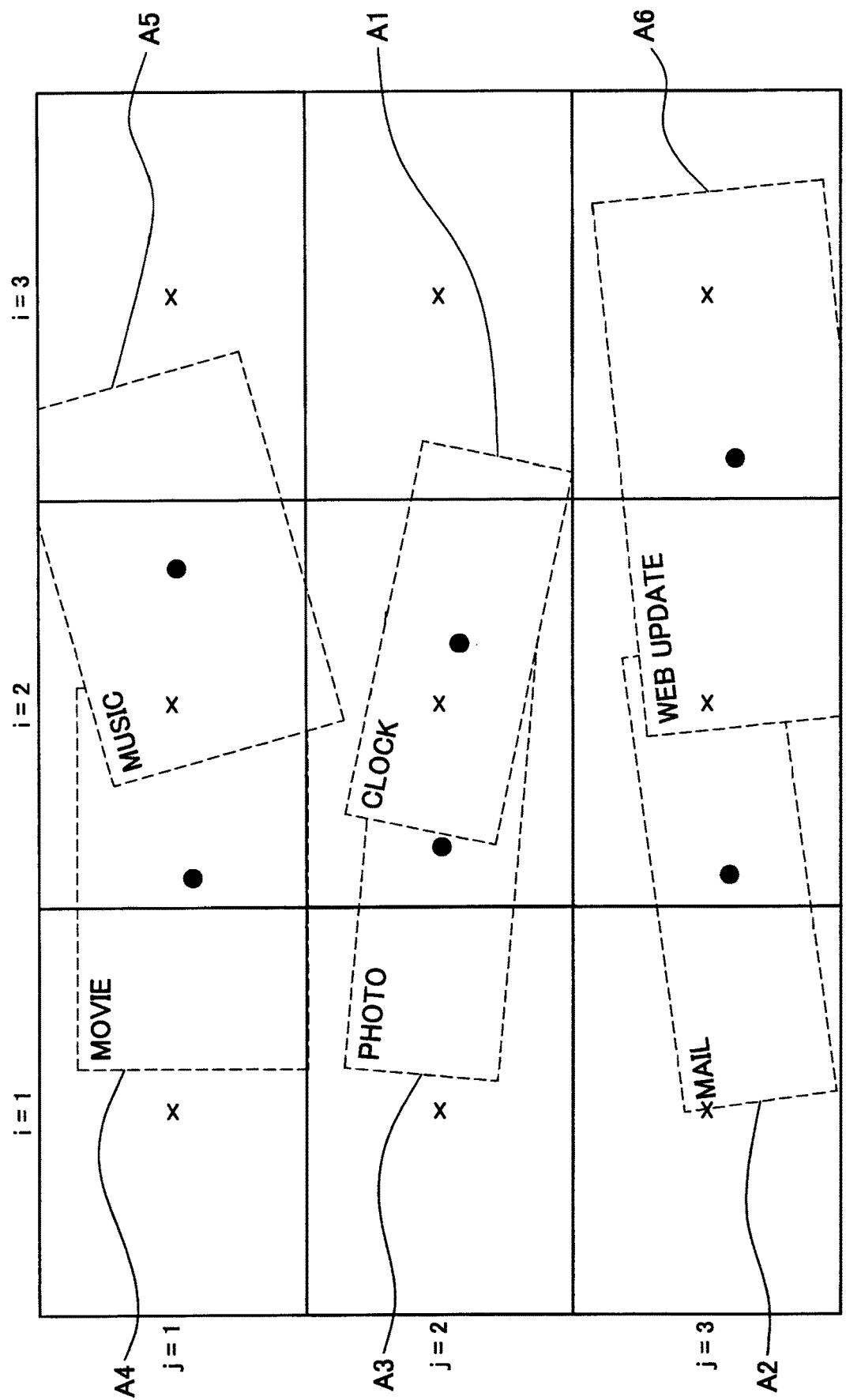

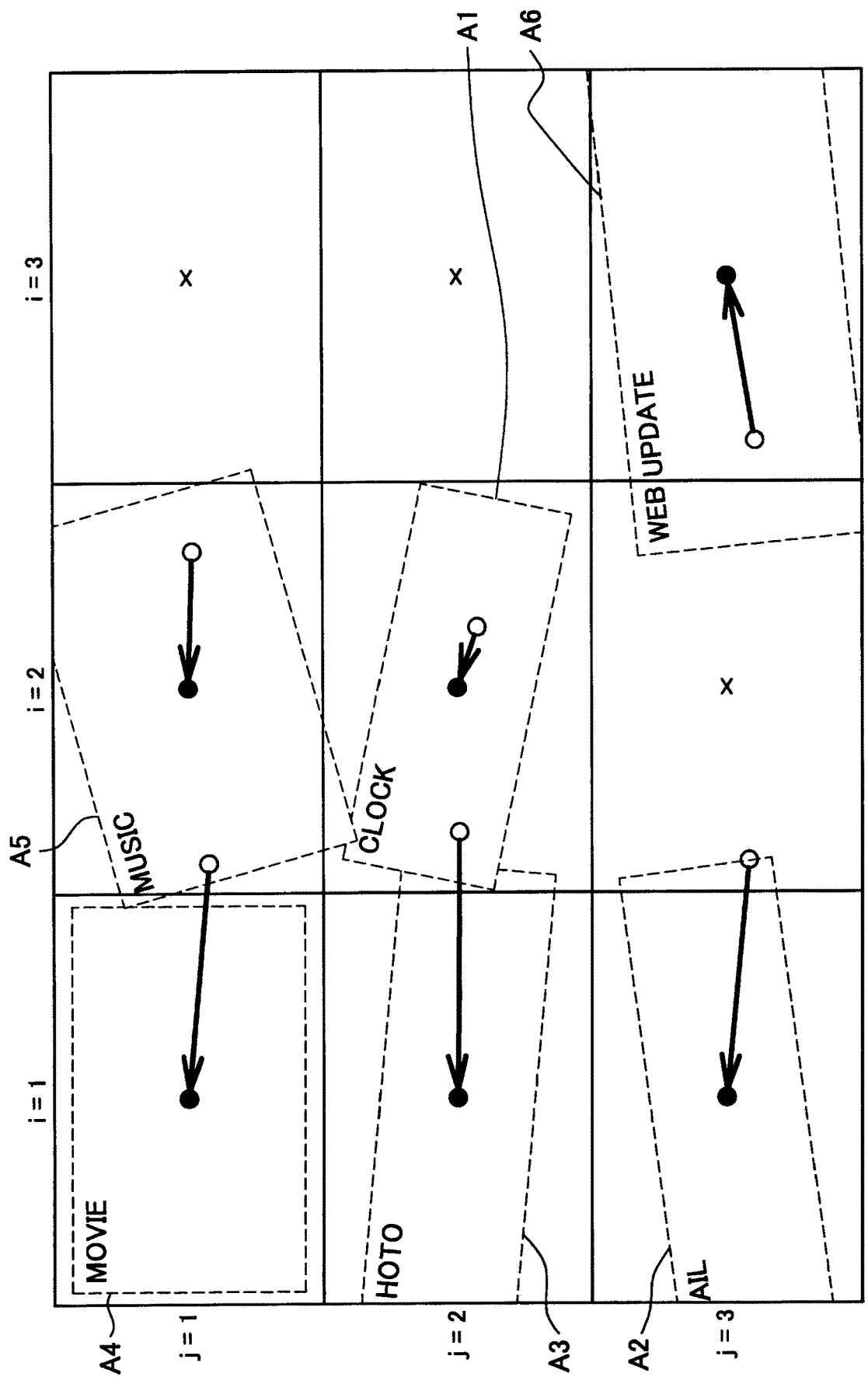

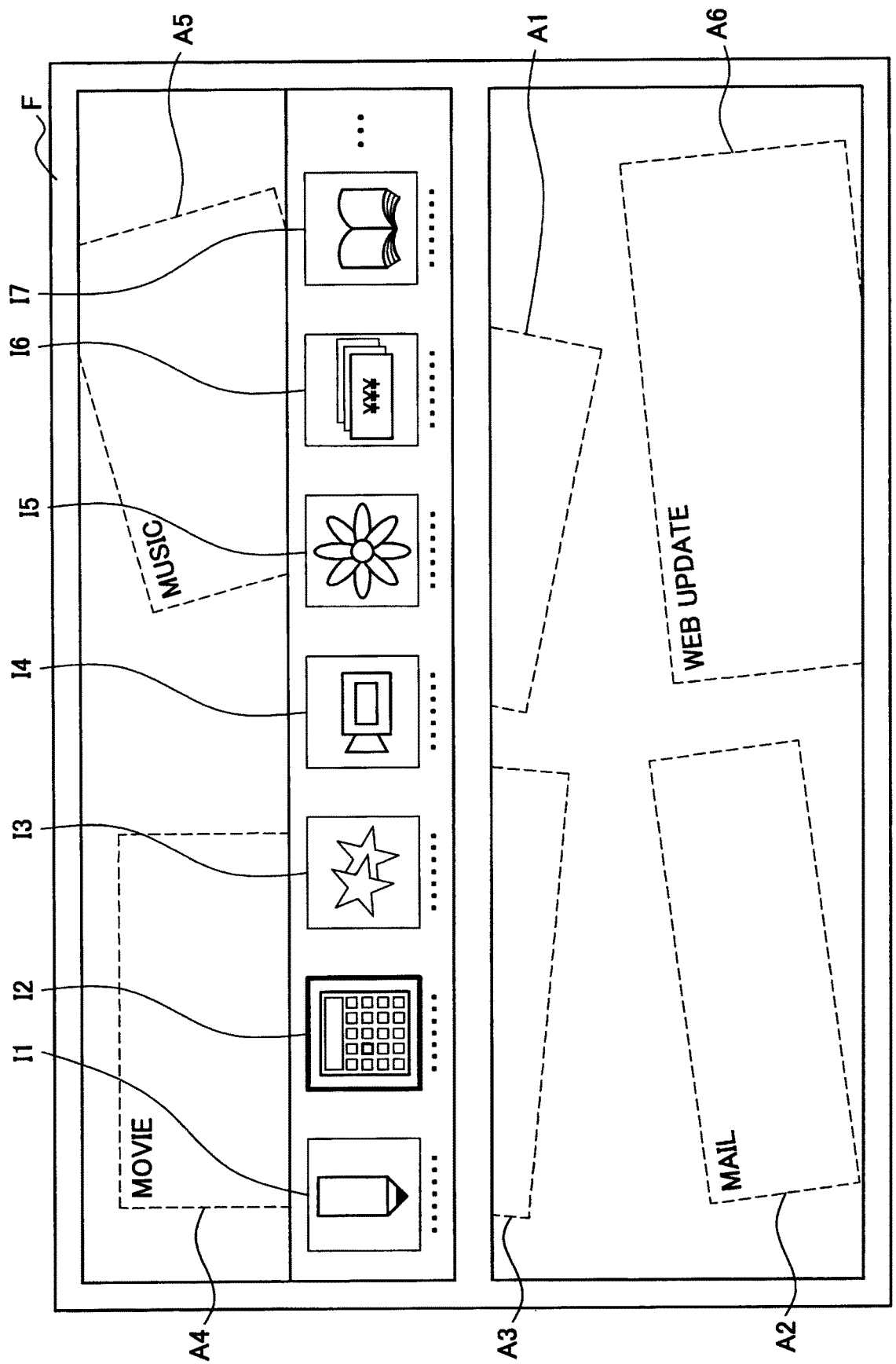

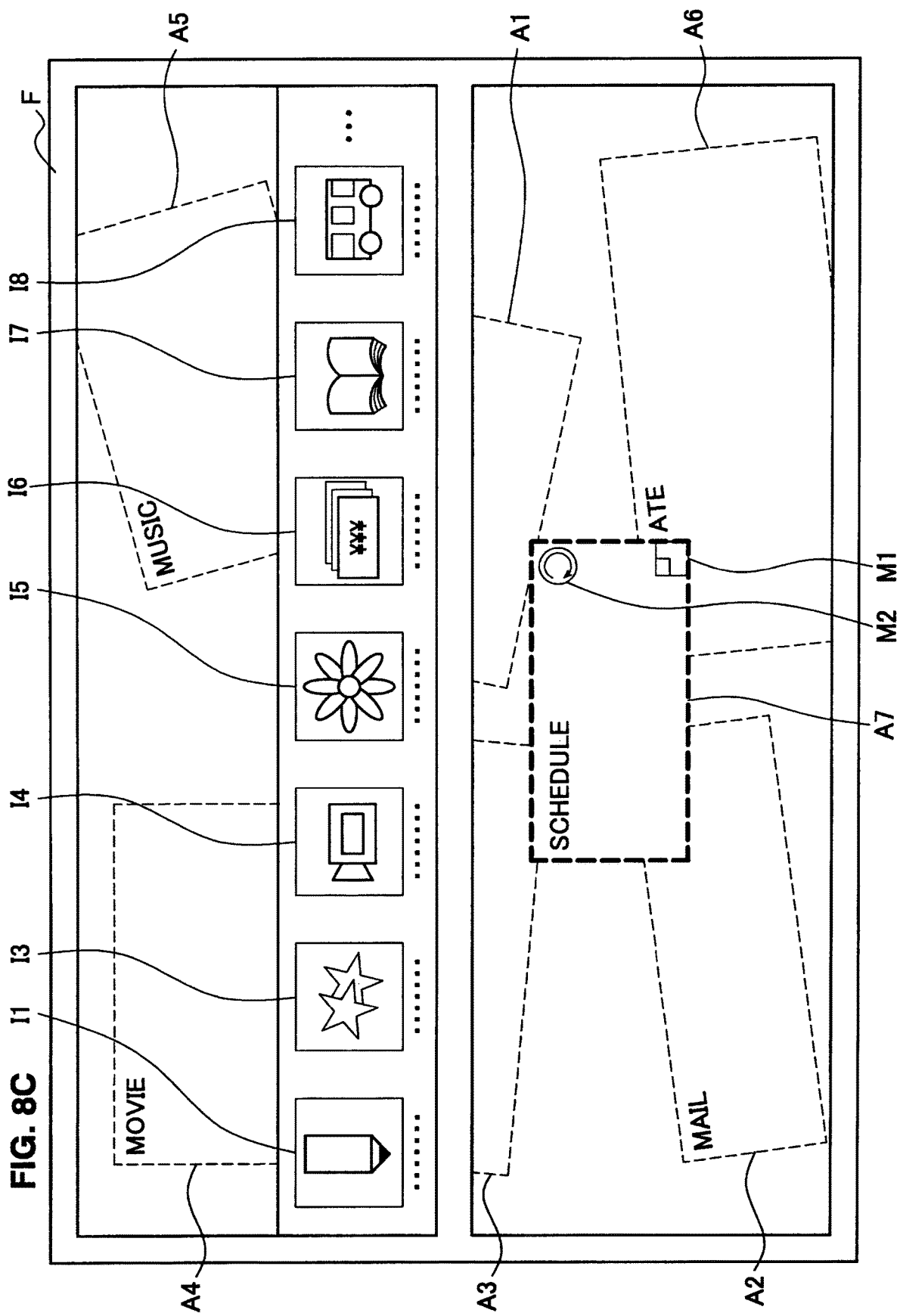

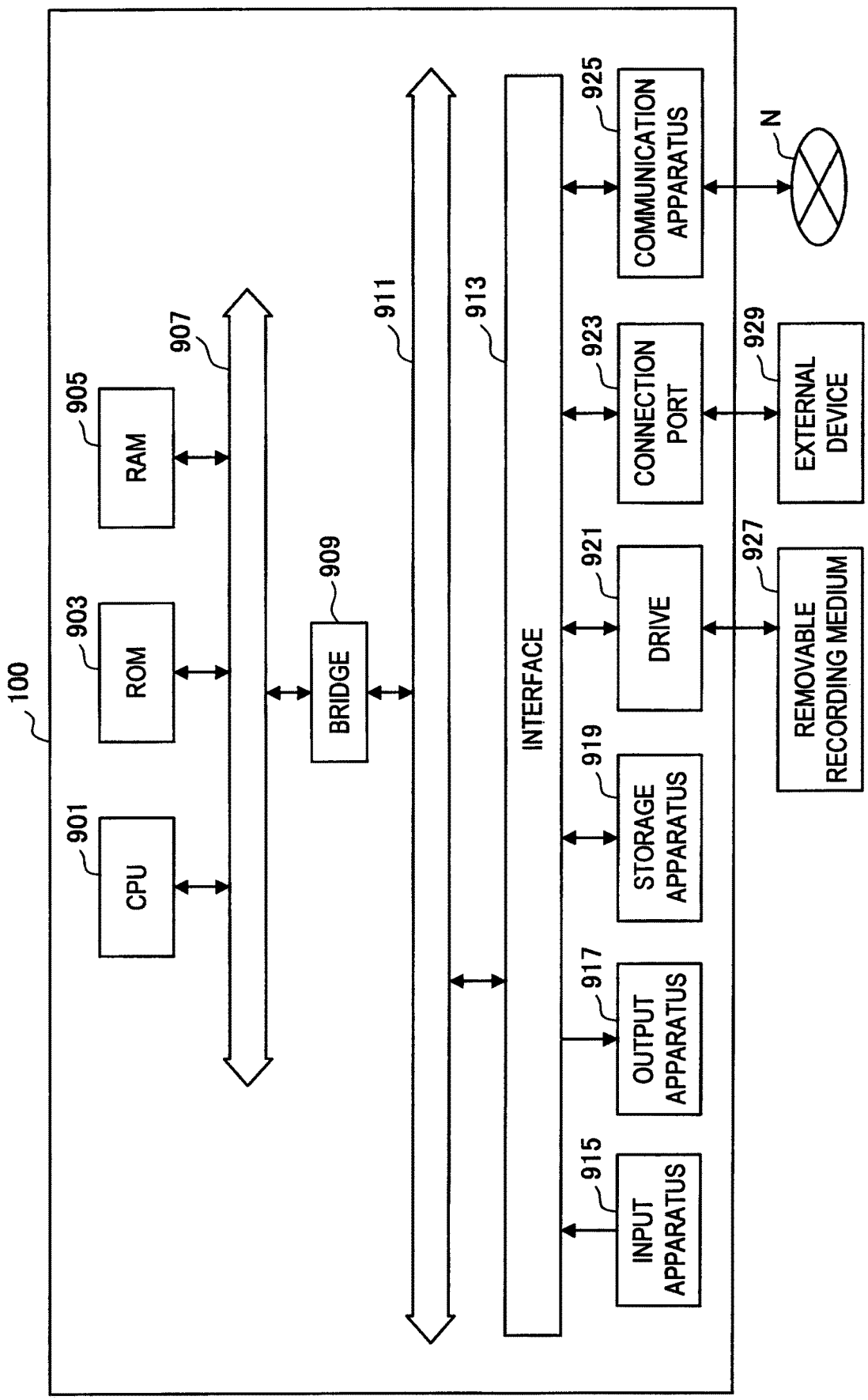

MENU DISPLAY APPARATUS, MENU DISPLAY METHOD AND PROGRAM

CROSS REFERENCE TO PRIOR APPLICATION

This application is a continuation of U.S. patent application Ser. No. 14/525,873 (filed on Oct. 28, 2014), which is a continuation of U.S. patent application Ser. No. 13/263,377 (filed Oct. 7, 2011 and issued as U.S. Pat. No. 8,918,738 on Dec. 23, 2014), which is a National Stage patent application of PCT International Patent Application No. PCT/JP2010/050596 (filed on Jan. 20, 2010) under 35 U.S.C. § 371, which claims priority to Japanese Patent Application No. 2009-099145 (filed on Apr. 15, 2009), which are all hereby incorporated by reference in their entirety.

TECHNICAL FIELD

The present invention relates to a menu display apparatus, a menu display method, and a program.

BACKGROUND ART

A plurality of pieces of application software (hereinafter, abbreviated as applications) is executed in an information processing apparatus such as a personal computer, PDA, and mobile phone. In the information processing apparatus, a desired application or content is selected by a user through a graphical user interface (GUI) menu including a plurality of applications and the application is activated.

In a conventional menu, information as regards selectable applications or information as regards content processed by an application is displayed according to display data set by the menu side. The display data means, for example, along with an image (an image such as an icon, thumbnail, and screen shot, text and the like) of an application or content, the arrangement, size and the like of the image on the menu. That is, information as regards applications or information as regards content is displayed in a menu according to specifications preset on the side of the menu.

SUMMARY OF INVENTION

Technical Problem

In a conventional menu, specifications of the menu are set on the side of the menu and it is difficult for the side of application to set menu specifications. Thus, it has been difficult for the application user to set menu specifications as desired through changes of content to be displayed in a menu and changes of display data, preventing the user from enjoying using a good menu environment. Also, it has been difficult for application developers to set menu specifications as desired, which has prevented such developers from providing a good user environment.

It is desirable to provide a menu display apparatus capable of setting menu specifications on the side of application, a menu display method, and a program.

Solution to Problem

According to a first aspect of the present invention, a menu display apparatus that displays a menu of a plurality of applications, including: an acquisition unit that acquires display data of content information representing content to be displayed in the menu of the content managed by each of the applications from each of the applications; and a display controller that controls a display of the content information in each area according to setting conditions for the area provided for each of the applications in the menu and the display data of the content information acquired from each of the applications is provided.

Accordingly, the display of the content information to be displayed in the menu in each area is controlled according to setting conditions for the area provided for each application in the menu and display data of the content information acquired from each application. Thus, menu specifications can now be set from the side of the application.

The acquisition unit may acquire the display data of the content information of the content set by each of the applications based on at least one of a usage date/time, an update date/time, or a usage frequency of the content or information specified by a user about the content of the content managed by each of the applications. Accordingly, menu specifications can be set from the side of the application according to the content set by each application based on the usage date/time, the update date/time, or the usage frequency of the content or information specified by a user as regards the content.

The acquisition unit may acquire an image of the content information, an arrangement, a size, and a rotation angle of the content information in the area as the display data of the content information. Accordingly, menu specifications can be set from the side of the application according to the display data including the image of the content information, the arrangement, size, and rotation angle of the content information in the area.

When the state of the application is updated, the display controller may control an update display of the content information in the area of the application whose state has been updated. Accordingly, an update display of the content information can be made in the area of the application whose state has been updated in accordance with the state update of the application.

The menu display apparatus may hold an arrangement, a size, and a rotation angle of the area in the menu as the setting conditions for the area. Accordingly, menu specifications can be set according to setting conditions including the arrangement, size, and rotation angle of the area in the menu.

The menu display apparatus may further include an editing unit that performs layout edit processing of the area in the menu, wherein the setting conditions decided based on a result of the layout edit processing are held as the setting conditions for the area. Accordingly, menu specifications can be set according to the layout of the area edited in the menu.

The menu display apparatus may further include a rearrangement unit that performs rearrangement processing of the area so that overlapping of the areas in the menu is reduced, wherein the setting conditions decided based on a result of the rearrangement processing are held as the setting conditions for the area. Accordingly, menu specifications can be set according to the arrangement of the areas rearranged in the menu.

The menu display apparatus may further include a registration unit that performs registration processing of the application with the menu, wherein the setting conditions for the area added for the application registered by the registration processing are held. Accordingly, menu specifications can be set according to the area of the application registered with the menu.

The menu display apparatus may further include an operation unit for operating the menu, wherein when the area caused to be focused in the menu via the operation unit is selected, the display controller controls the display of a sub-menu of the application corresponding to the selected area and the display of the content information in the sub-menu of the content managed by the application. Accordingly, the sub-menu of the application corresponding to the area can be displayed in accordance with the selection of the area in the menu to display the content information of content management by the application.

The menu display apparatus may further include an execution preparation unit that makes preparations for execution of the application, wherein when the content information is selected from the sub-menu via the operation unit, the execution preparation unit provides activation parameters of the content corresponding to the selected content information to the application that processes the content. Accordingly, the application that processes content corresponding to the content information can be activated in accordance with the selection of the content information from the sub-menu.

If the focus for the area is moved in the menu via the operation unit, the display controller may control a rotation display of a menu region so that a rotation angle of the area caused to be focused becomes 0° in accordance with the area caused to be focused by the focus moved in a spiral fashion with a center of the menu region set as a reference.

If the area caused to be focused in the menu via the operation unit is selected, the display controller may control a zoom-in display of the sub-menu of the application corresponding to the selected area.

If a return to the menu is instructed in the sub-menu via the operation unit, the display controller may control a zoom-out display from the sub-menu to the menu.

According to a second aspect of the present invention, a menu display method of displaying a menu of a plurality of applications, including: acquiring display data of content information representing content to be displayed in the menu of the content managed by each of the applications from each of the applications; and controlling a display of the content information in each area according to setting conditions for the area provided for each of the applications in the menu and the display data of the content information acquired from each of the applications is provided.

Accordingly, the display of the content information to be displayed in the menu in each area is controlled according to setting conditions for the area provided for each application in the menu and display data of the content information acquired from each application. Thus, menu specifications can now be set from the side of the application.

According to a third aspect of the present invention, a program causing a computer to execute the menu display method according to the second aspect is provided.

Advantageous Effects of Invention

According to the present invention, as described above, a menu display apparatus capable of setting menu specifications on the side of application, a menu display method, and a program can be provided.

BRIEF DESCRIPTION OF DRAWINGS

FIG. 4A is a diagram showing a display example of an overall view mode.

FIG. 4B is a diagram showing a display example when a focus is moved in an overall view mode.

FIG. 4C is a diagram showing a display example in an area view mode.

FIG. 4D is a display example in an application execution mode.

FIG. 5 is a diagram showing focus movement between areas.

FIG. 6A is a diagram showing edit processing (arrangement change) of an area.

FIG. 6B is a diagram showing edit processing (size change) of the area.

FIG. 6C is a diagram showing edit processing (rotation angle change) of the area.

FIG. 7A is a diagram showing rearrangement processing (before rearrangement) of the area.

FIG. 7B is a diagram showing rearrangement processing (after rearrangement) of the area.

FIG. 8A is a diagram showing registration processing of an application.

FIG. 8C is a diagram showing the registration processing of the application.

FIG. 9 is a block diagram showing a hardware configuration example of the menu display apparatus.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and description thereof will not be repeated here.

1. Function Configuration of Menu Display Apparatus 100

Figure 1:
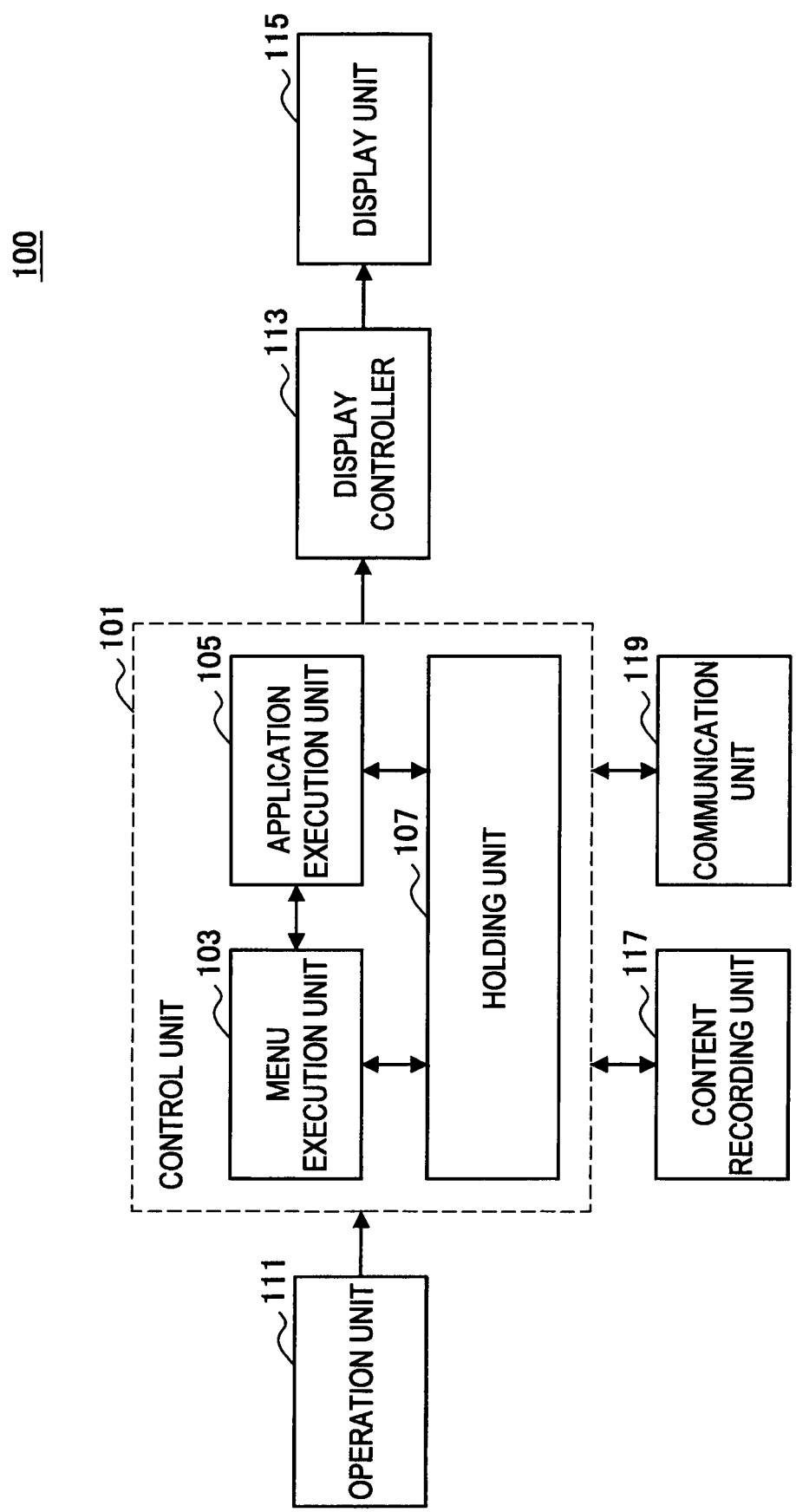
FIG. 1 is a block diagram showing a function configuration of a menu display apparatus according to an embodiment of the present invention.

FIG. 1 is a block diagram showing the function configuration of the menu display apparatus 100. The menu display apparatus 100 is configured as an information processing apparatus such as a personal computer, PDA, and mobile phone. As shown in FIG. 1, the menu display apparatus 100 includes a control unit 101, an operation unit 111, a display controller 113, a display unit 115, a content recording unit 117, and a communication unit 119.

The control unit 101 includes a CPU, ROM, and RAM and controls the whole menu display apparatus 100. The CPU reads a program such as a menu display program and application program from the ROM or the like and expands the program over the RAM for execution.

The control unit 101 includes a menu execution unit 103, an application execution unit 105, and a holding unit 107. The menu execution unit 103 executes a menu display program and the application execution unit 105 executes an application program. The holding unit 107 is composed of a nonvolatile memory or the like and holds various programs and executable data of various programs. The holding unit 107 holds registration information of applications, setting conditions for an area A provided for each application in a menu, and display data of content information C displayed in each area A. The holding unit 107 also holds display data of the content information C displayed for each application in a submenu.

Setting conditions for the area A includes the arrangement, size, rotation angle, application name, and identifier of the area A in a menu. Setting conditions for the area A are set based on preset values when an application is registered and adjusted by the user if necessary before being written into the holding unit 107. After application registration, setting conditions for the area A are also written into the holding unit 107 after being changed by the user if necessary.

Display data of the content information C represent content (including sub-content) to be displayed in a menu or sub-menu of content managed by each application. Display data of the content information C includes a list of the content information C to be displayed, images of the content information C, and the arrangement, size, rotation angle, content name, and identifier of the content information C in the area A or a sub-menu. Display data of the content information C is written into the holding unit 107 by the application execution unit 105 when each application (including a service described later) is executed.

Content to be displayed in a menu or sub-menu is set by each application. For a Web browser, for example, sites whose browsing date/time or registration date/time is new, sites accessed frequently, and sites whose update date/time is new among registered sites are set. For a music player, compositions whose playback date/time is new, a play list whose registration date/time is new, compositions/play list whose playback frequency is high, and compositions whose evaluation by the user is high are set. For a video player, video whose playback date/time is new, video whose playback frequency is high, and video whose evaluation by the user is high are set. For a photo viewer, images whose display date/time is new, images whose display frequency is high, and images whose evaluation by the user is high are set. For a mailer, mails for each mail provider are set. For a map viewer, maps whose display date/time is new and maps whose display frequency is high are set. For a scheduler, a schedule for today, a schedule for this week, and plans for registered commemoration days are set. For an application downloader, applications whose registration date/time is new and applications whose download frequency is high are set.

Display data of the content information C is provided to the menu execution unit 103 by the application execution unit 105 through execution of each application according to predetermined rules (data types, formats and the like) defined for executing the menu display method. Rules for executing the menu display method are limited to minimum items so that various applications can be registered with a menu.

Images of the content information C is set by each application. For a Web browser, for example, a screen shot image of a Web page and a logo mark/icon related to the Web page are set. For a music player, a jacket photo for a music album and preset icons that can be used as a substitution for the jacket photo are set. For a video player, video title images and screen shot images of playback video are set. For a photo viewer, thumbnail images of photos and thumbnail images of typical photos for each album are set. For a mailer, a mail icon is set. For a map viewer, snapshot images of maps, snapshot images of customized maps, registered points/routes are set. For a scheduler, an icon with an icon attached thereto is set. For an application downloader, snapshot images/icons of downloadable applications are set.

The name of content is also set by each application. For a Web browser, for example, the title of content tagged to a Web page and bookmark names specified by the user are set. For a music player, composition/play list/album names are set. For a video player, names of video titles are set. For a photo viewer, the file name of photos, names set by users, and names recorded as metadata of photos are set. For a mailer, names of mail providers are set. For a map viewer, the latest access points by users and names set by users are set. For a scheduler, names of plans are set. For an application downloader, names of downloadable applications are set.

The content information C may contain parameters used for activation of applications corresponding to content. Parameters are also set by each application. For a Web browser, for example, URL of the site selected from a sub-menu is set. For a music player, the identifier of the composition/album/play list selected from a sub-menu is set. For a video player, the identifier of the video selected from a sub-menu is set. For a photo viewer, the identifier of the photo selected from a sub-menu is set. For a mailer, the identifier of the mail provider selected from a sub-menu is set. For a map viewer, the mode when activated such as the display mode based on a specified point and the route search mode is set. For a scheduler, the identifier of the plan selected from a sub-menu is set. For an application downloader, the identifier of the application to be downloaded is set.

The menu execution unit 103 has functions of an acquisition unit, editing unit, rearrangement unit, registration unit, and execution preparation unit. The menu execution unit 103 reads and acquires display data of the content information C written by the application execution unit 105 through execution of an application from the holding unit 107. The menu execution unit 103 performs edit processing of the area A on a menu via the operation unit 111. The menu execution unit 103 performs rearrangement processing of the areas A on the menu so that overlapped arrangement of the areas A is reduced. The menu execution unit 103 performs registration processing of an application with the menu. The menu execution unit 103 makes preparations for execution of an application by the application execution unit 105.

The operation unit 111 acquires operation information input by the user. Operation information is input through operations by the keyboard, pointing device, a user's finger O and the like. The display controller 113 controls the display unit 115 to make a display of the menu/sub-menus and also to make a display when an application is executed. The display unit 115 makes a display of the menu/sub-menus and also makes a display when an application is executed. The display unit 115 is a liquid crystal panel contained in the menu display apparatus 100, an LCD externally attached to the menu display apparatus 100 or the like. A case where the operation unit 111 and the display unit 115 are integrated as a touch panel will be described below, but the operation unit 111 and the display unit 115 may be provided separately.

The content recording unit 117 records content processed by applications that can be activated from the menu display apparatus 100 and content information C. The content recording unit 117 records content and content information C by associating with applications. The communication unit 119 transmits/receives data to/from other information processing apparatuses such as a service provider via a communication network N.

An application is software having a GUI to communicate with the user, having a function to perform the work desired by the user to perform with the menu display apparatus 100, and which can be activated from the menu display apparatus 100. Hereinafter, software like an accessory having a GUI such as a widget is also called an application. A so-called service that executes a portion of application functions, but does not have a GUI is distinguished from the applications. A service is a program or the like executed in the background of a menu display program even when, for example, a mailer having a GUI is not executed to perform a mail transmitting/receiving function. Content means entity data such as still images, video, voice, text, Web pages, mail, and games. Content information C means information accompanying entity data of content such as the identifier, name, category, and icon of content.

2. Menu Display Method

Figure 2:
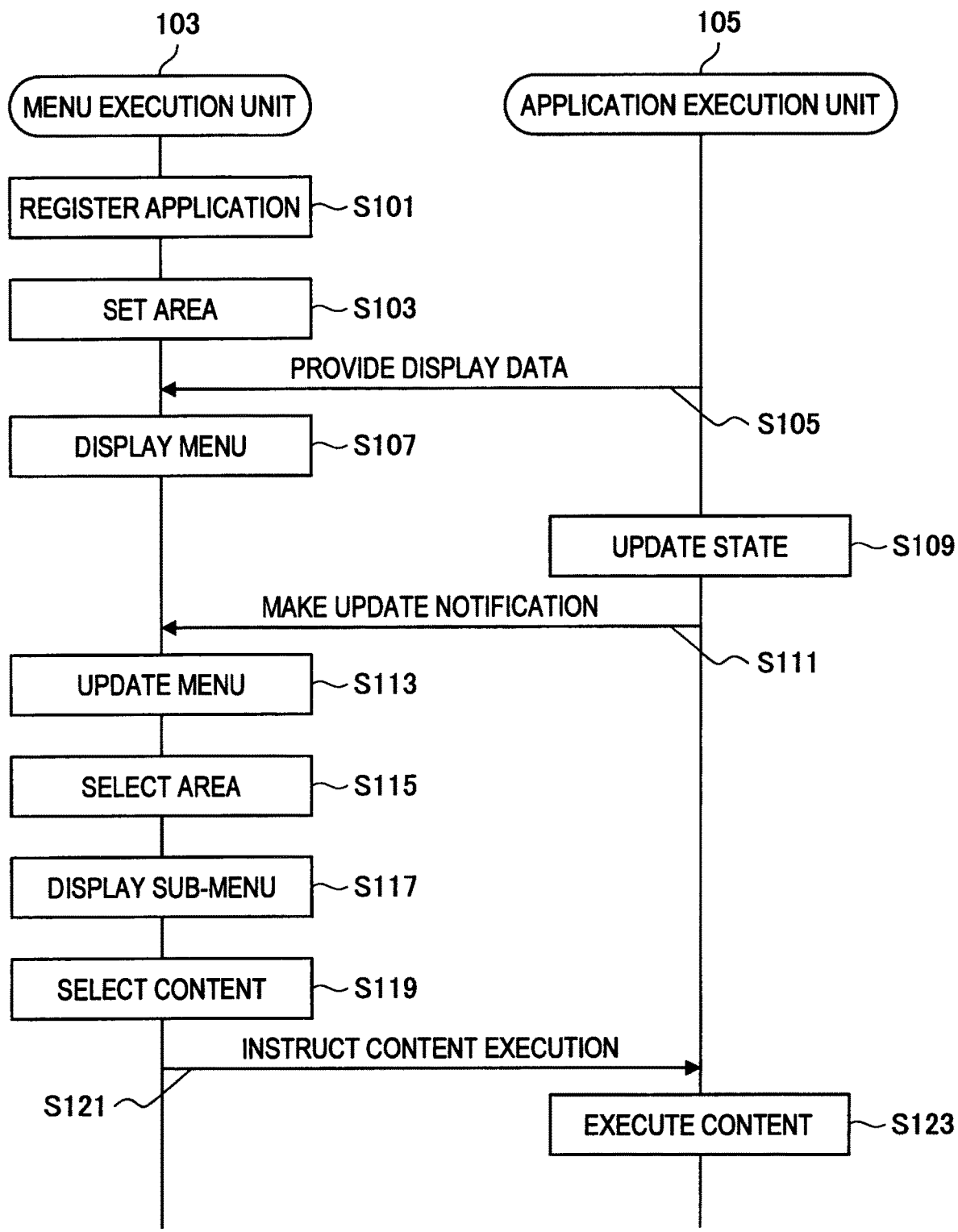
FIG. 2 is a flow chart showing a processing order of a menu display method.

FIG. 2 is a flow chart showing the processing order of the menu display method.

As shown in FIG. 2, the menu execution unit 103 registers applications that can be activated by the menu display apparatus 100 with a menu (step S101). Applications are registered based on preset values when a menu display program is installed or registered by a user's operation in launcher mode OM5. Then, registration information of applications is written into the holding unit 107.

The menu execution unit 103 sets setting conditions for the area A for each of the registered applications (S103). Setting conditions for the area A includes the arrangement, size, and rotation angle of the area A in the menu. Setting conditions for the area A are set based on preset values when the area A is registered and adjusted by the user if necessary before being written into the holding unit 107. After area A registration, setting conditions for the area A are also written into the holding unit 107 after being changed by the user if necessary in area editing mode OM4.

The application execution unit 105 provides display data of the content information C representing content to be displayed in the menu/sub-menus through execution of each application (S105). Display data of the content information C is created based on the content information C recorded in the content recording unit 117 and/or based on a user's operation and written into the holding unit 107 for each application. Display data of the content information C is written periodically or non-periodically during execution of an application (and a service).

The application execution unit 105 sets content to be displayed in the menu/sub-menus through execution of each application. Content to be displayed in the menu/sub-menus is set based on the usage date/time of content, update date/time, usage frequency, and information specified by the user concerning content. Content to be displayed in the menu/sub-menus is set as content executed by an application immediately before, content whose update is detected immediately before, content whose usage frequency is high, or content specified by the user immediately before via an application.

The application execution unit 105 sets for each application display data of the content information C representing content to be displayed in the menu/sub-menus through execution of each application. Display data of the content information C includes a list of the content information C, images of the content information C, and the arrangement, size, rotation angle and the like of the content information C in the area A. The type, format and the like of display data of the content information C are preset between the application and the menu execution unit 103. That is, display data of the content information C is provided to the menu execution unit 103 by the application execution unit 105 through execution of an application according to predetermined rules defined for executing the menu display method.

The menu execution unit 103 causes the display unit 115 to display the menu via the display controller 113 according to registration information of the application, setting conditions for the area A corresponding to the application, and display data of the content information C (S107). The menu execution unit 103 reads display data of an application periodically or non-periodically from the holding unit 107 during execution of the menu such as when the menu is activated or the application terminates. In the menu, display data of the content information C representing content to be displayed in the menu is displayed in the area A set for each registered application.

If the state of each application is updated through execution of the application, the application execution unit 105 notifies the menu execution unit 103 of the state update (S109, S111). The state update of an application can be notified if a service is being executed even though the application execution unit 105 is not executing the application.

The state update of an application is notified when, for example, content is used or updated or an operation is performed on content so that it becomes necessary to change the display of the corresponding area A. In accordance with the state update of an application, the application execution unit 105 writes display data necessary to update the display of the corresponding area A into the holding unit 107. It is desirable that the application execution unit 105 make a notification of the state update after identifying the application and content information C. Then, the menu execution unit 103 reads the updated display data from the holding unit 107 to cause the display unit 115 to display the updated menu via the display controller 113 (S113).

The notification of the state update is used for different uses from application to application. For example, the notification of the state update is used to make a notification that recommendation information is acquired from a service provider registered for each application via the communication unit 119. A music player, video player, or photo player uses the notification of the state update to make a notification of addition/deletion of content to/from a specific recording location of the menu display apparatus 100 such as addition/deletion of content to/from the menu display apparatus 100. A Web browser uses the notification of the state update to make a notification of the update of an RSS channel registered by the user. A mailer uses the notification of the state update to make a notification of new mail. A scheduler uses the notification of the state update to make a notification of the arrival of the time point set by the user.

If the area A in the menu is selected, the menu execution unit 103 causes the display unit 115 to display, via the display controller 113, the sub-menu of the application corresponding to the selected area A (S115, S117). The menu execution unit 103 causes the display unit 115 to display the sub-menu via the display controller 113 according to display data of the content information C representing content (including sub-content) to be displayed in the sub-menu.

If content (including sub-content) is selected from the sub-menu, the menu execution unit 103 notifies the application execution unit 105 of content execution instructions (S119, S121). Execution instructions are notified together with parameters for application activation if necessary. The application execution unit 105 executes the application that processes the selected content (S123). The application execution unit 105 reads the selected content from the content recording unit 117 to process the content through execution of the application.

3. Operation Mode

Figure 3:
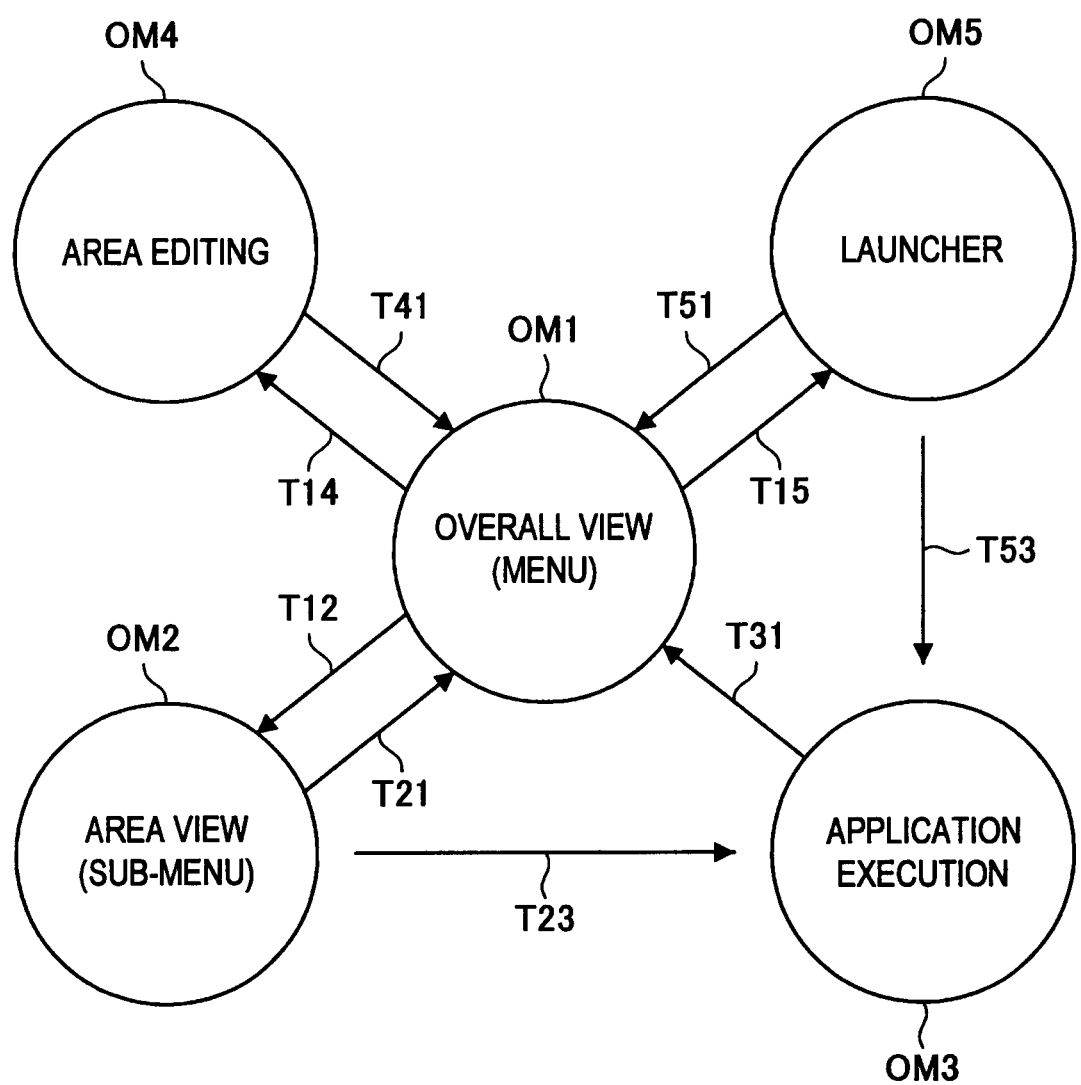
FIG. 3 is a diagram showing transitions of a operation mode of the menu display apparatus.

FIG. 3 is a diagram showing transitions of the operation mode of the menu display apparatus 100. As shown in FIG. 3, the menu display apparatus 100 has operation modes of an overall view mode OM1, an area view mode OM2, an application execution mode OM3, the area editing mode OM4, and the launcher mode OM5.

The overall view mode OM1 is a mode in which a menu of a plurality of applications is displayed by using the area A provided for each application. The area view mode OM2 is a mode in which the sub-menu of an application is displayed. The application execution mode OM3 is a mode in which an application is executed. The area editing mode OM4 is a mode in which the layout of the area A is edited in the menu. The launcher mode OM5 is a mode in which an application is activated or an application is registered.

In accordance with a selection operation of the area A, the operation mode is switched from the overall view mode OM1 to the area view mode OM2 (T12). In accordance with a mode selection operation, the operation mode is switched from the area view mode OM2 to the overall view mode OM1 (T21). In accordance with content execution instructions in the sub-menu, the operation mode is switched from the area view mode OM2 to the application execution mode OM3 (T23). In accordance with a mode selection operation in an execution screen of an application, the operation mode is switched from the application execution mode OM3 to the overall view mode OM1 (T31).

In accordance with a mode selection operation, the operation mode is switched between the overall view mode OM1 and the area editing mode OM4 (T14, T41) and the operation mode is switched between the overall view mode OM1 and the launcher mode OM5 (T15, T51). Also, in accordance with an activation operation of an application, the operation mode is switched from the launcher mode OM5 to the application execution mode OM3 (T53).

FIG. 4 is a diagram showing transitions of the operation mode from the overall view mode OM1 through area view mode OM2 to the application execution mode OM3. FIG. 5 is a diagram showing focus movement between the areas A.

In FIG. 4, the menu display apparatus 100, which is a folding PDA, is displayed. The menu display apparatus 100 is provided with a frame F that partitions the display screen into an upper region and a lower region to realize a folding mechanism. Hereinafter, though the display screen of the menu display apparatus 100 is partitioned into the upper region and the lower region, a case where the display screen is composed of a single display region is also described in the same manner.

[3-1. Overall View Mode OM1]

In FIG. 4A, a display example of the menu in overall view mode OM1 is shown. In the upper region and lower region, along with the area A for each registered application, display data of the content information C representing content to be displayed in the menu is displayed in each area A.

The menu execution unit 103 causes the display unit 115 to display the menu via the display controller 113 according to registration information of an application, setting conditions for the area A corresponding to the application, and display data of the content information C to be displayed in the menu.

In the example shown in FIG. 4A, areas A1, A2, A3, A4, A5, and A6 are provided for each of the applications such as the clock, mail, photo, movie, music, and Web update respectively in the menu. While the area A is provided as a rectangular region, the areas A may be provided as a region having a shape other than a rectangle. Starting point moving buttons "PREY", "NEXT" B1, B2 to move the focus between the areas A are displayed at the bottom of the display screen. Launcher buttons B3, B4 to display a launcher L in each of the upper region and lower region are displayed at the left end and right end of the display screen respectively.

In the area A1 of the clock, the content information C of clock content is displayed. In the area A2 of the mail, the mail reception date is displayed along with the content information C of mail content received immediately before. In the area A3 of the photo, the content information C (thumbnail images) of photo content is displayed. In the area A4 of the movie, the content information C (screen shot images) of movie content played back immediately before and the content information C of related content are displayed. In the area A5 of music, the content information C (album image) of music content played back immediately before. In the area A6 of the Web update, page update dates are displayed along with the content information C (screen shot images of Web pages) of Web content updated immediately before.

The name of the application corresponding to the area A is displayed in each area A and depending on the application, the name of content is displayed. In the menu, the area A4 of the movie indicated by a thick broken line is focused.

The area A is displayed in a predetermined layout in a menu region according to setting conditions including the arrangement of the area A, size, rotation angle, application name, and identifier. The menu region is a virtual plane where the area A of an application registered with the menu is laid out and a portion thereof is displayed on the display screen. The arrangement of the area A is defined by setting the upper left corner of the area A as a reference point, the size thereof is defined as relative coordinates from the reference point to the lower right corner of the area A, and the rotation angle thereof is defined as an angle with the reference point set as a rotation center.

Content information C is displayed in a predetermined layout in each area A according to display data composed of a list of the content information C, an image of the content information C, and the arrangement, size, rotation angle, content name, and identifier of the content information C in each area A. Like the area A, the arrangement, size, and rotation angle of the content information C is defined for display data of the content information C.

While the areas A are not arranged by overlapping with the other area A in the example shown in FIG. 4A, the area A may be arranged by overlapping with the other area A. In such a case, the display controller 113 controls the display of the areas A in such a way that the area A with an increasing priority is displayed so as to come to the top on the display screen according to the order of priorities set for each area A. It is desirable that the display controller 113 control the display of the area A so that the focused area A is displayed on top of the other areas A on the display screen.

The menu region can be scrollably displayed vertically, horizontally, or in a slanting direction with respect to the display screen and can also be rotatably displayed around the center of the menu region. If a drag operation is performed by specifying a region other than the area A in the menu, the menu region is scrolled and displayed by being linked to the drag operation. The drag operation is an operation in which the finger O in contact with the display screen is moved to a predetermined position on the display screen. If one of the focus moving buttons "PREY", "NEXT" B1, B2 is operated, the menu region is rotated in accordance with the focus movement and displayed.

When the menu region is scrolled and displayed, the menu execution unit 103 calculates the layout of the area A on the display screen after scrolling and causes the display unit 115 to display the menu region after scrolling via the display controller 113. When the menu region is scrolled and displayed, the menu execution unit 103 calculates the layout of the area A on the display screen after scrolling by considering the scroll amount of the menu. A region of the menu region that extends beyond the display screen is not displayed.

FIG. 4B shows a state after the focus is moved from the state shown in FIG. 4A to the area A5 of music. The focus order is set to each area A in accordance with the arrangement of the area A in the menu region. The focus is moved to the area A in the next or previous focus order of the focused area A in accordance with the operation of the "PREV" or "NEXT" button B1, B2 in the menu.

The menu execution unit 103 calculates the layout of the area A and the content information C on the display screen by calculating a predetermined rotation angle from the rotation angle of the area A5 of music and performing coordinate conversion processing. Then, based on a processing result, the display controller 113 controls the display of the content information C in the area A for content to be displayed in the menu.

When the menu region is rotated and displayed, the menu execution unit 103 calculates a layout of the area A and the content information C on the display screen after the rotation and causes the display unit 115 to display the menu region after the rotation via the display controller 113. Display data of the content information C is set based on a state in which the menu region is not rotated. Thus, if the menu region is rotated and displayed, the menu execution unit 103 calculates the layout of the content information C on the display screen after the rotation by considering the rotation amount of the menu region for display data of the content information C.

In the example shown in FIG. 5, the focus order is set in a spiral fashion with the center of the menu region set as a reference. The focus order is set clockwise along a spiral with the area A arranged in the center of the spiral set as a starting point. In this case, the menu region is divided into, for example, 3×3 grid-like subregions (i, j) and each area A is allocated to the subregion in accordance with the center position (marked by • in FIG. 5) of the area A. The division number of subregions and the division shape are appropriately set in accordance with the number of areas A and the shape thereof.

As shown in FIG. 5, the upper left subregion and the lower right subregion are defined as a subregion (1, 1) and a subregion (3, 3), respectively. The areas A1, A2, A3, A4, A5, and A6 of the clock, mail, photo, movie, music, and Web update are allocated to subregions (2, 2), (1, 3), (1, 2), (1, 1), (3, 1), and (3, 3), respectively. The focus order is set in the order of the area A1 of clock, the area A2 of mail, the area A3 of photo, the area A4 of movie, the area A5 of music, and the area A6 of Web update clockwise in a spiral fashion using the subregion (2, 2) as a reference. If a plurality of areas A is allocated to the same subregion, the focus order of the areas A is set so that the focus order of the area A arranged in a position closer to the setting direction of the focus order is earlier.

In the state shown in FIG. 4B, the menu region rotates clockwise after the "NEXT" button B2 being operated in the state shown in FIG. 4A and the area A5 of music having the next focus order after the area A4 of movie is focused. The rotation angle of the menu region is adjusted so that the rotation angle of the area A5 of music becomes 0°. Accordingly, visibility of the focused area A5 can be improved.

[3-2. Area View Mode OM2]

In FIG. 4C, a display example of the sub-menu in area view mode OM2 is shown. In FIG. 4C, a state in which the area A5 of music is selected from the state shown in FIG. 4B is shown. If a region of the area A is specified and a pointing operation is performed on the region over a predetermined period in overall view mode OM1, the operation mode is switched to the area view mode OM2.

If the area A is selected, the selected area A is zoomed in and displayed in the upper region and content information C0 displayed in the area A is enlarged and displayed. In the lower region, content information C1 to C3 of sub-content to be displayed in the menu is displayed.

The menu execution unit 103 causes the display unit 115 to display the sub-menu via the display controller 113 according to display data of the content information C0 to C3 to be displayed in the sub-menu.

In the example shown in FIG. 4C, a jacket image of a music album and a set of musical pieces of recorded tracks are displayed in the upper region as the content information C0. In the lower region, the jacket images containing the musical piece of the recorded track are displayed as the content information C1 to C3 of sub-content. An "ALL VIEW" button B5 to switch the operation mode to the overall view mode OM1 and selection buttons "PREV", "NEXT" B6, B7 to select sub-content are displayed at the bottom of the display screen. In the lower region, a "PLAY" B8 button to instruct the playback of the sub-content selected by operating the selection buttons B6, B7 is displayed.

In the state shown in FIG. 4C, the menu execution unit 103 switches the operation mode to the overall view mode OM1 shown in FIG. 4B by being accompanied by a zoom-out display from the area A to the menu in accordance with the operation of the "ALL VIEW" button B5. After the operation mode is switched, the menu region may be displayed without being scrolled and rotated. The menu execution unit 103 causes the user to select sub-content by using the cursor moving between sub-content in accordance with the operation of the "PREY", "NEXT" buttons B6, B7. In the state shown in FIG. 4C, the sub-content C1 is selected.

[3-3 Application Execution Mode OM3]

In FIG. 4D, a display example of the application execution screen is displayed. FIG. 4D shows a state in which the playback of sub-content is instructed in the state shown in FIG. 4B. If execution of sub-content is instructed by the "PLAY" button B8 in area view mode OM2, the operation mode is switched to the application execution mode OM3.

The menu execution unit 103 notifies the application execution unit 105 of execution instructions including parameters such as the content information C of the sub-content selected from the sub-menu. The application execution unit 105 reads the content from the content recording unit 117 to process the content through execution of the application that processes the sub-content to be executed.

In the state shown in FIG. 4D, the execution screen of the application is displayed by overlapping with the menu shown in FIG. 4B. In the upper region, an operation menu AM of the application is displayed along with the content information C shown in FIG. 4C. In the operation menu AM of the application, information as regards the sub-content being played back and operation buttons of Pause, Fast Reverse, and Fast Forward are displayed. The "ALL VIEW" button B5 to switch the operation mode to the overall view mode OM1 is displayed at the bottom of the display screen.

In the state shown in FIG. 4D, the menu execution unit 103 switches the operation mode to the overall view mode OM1 shown in FIG. 4B in accordance with the operation of the "ALL VIEW" button B5. The application execution unit 105 performs playback processing of sub-content in accordance with the operation of operation buttons in the operation menu AM.

[3-4. Area Editing Mode OM4]

FIG. 6 is a diagram showing edit processing of the area A. If a region corresponding to the area A on the display screen of the menu is touched over a predetermined period by the finger O or the like, the operation mode is switched from the overall view mode OM1 to the area editing mode OM4 and now the area A is editable. If a region outside the area A is touched by the finger O or the like over a predetermined period in an editable state, the operation mode is switched from the area editing mode OM4 to the overall view mode OM1.

In the example shown in FIG. 6, the area A4 of movie indicated by a thick broken line becomes an area to be edited. Change marks M1, M2 for changing the size and the angle are displayed in predetermined positions of the area A. In area editing mode OM4, as shown below, the arrangement, size, and rotation angle of the area A can be changed.

If, as shown in FIG. 6A, the user specifies a region outside the change marks M1, M2 in the area A4 and performs a drag operation, the arrangement of the area A4 is changed. The area A4 is changed in arrangement and displayed by being linked to the drag operation of the area A4 and the arrangement thereof is changed in accordance with the position of an area A4' after the drag operation.

If, as shown in FIG. 6B, the user specifies the size change mark M1 in the area A4 and performs a drag operation, the size of the area A4 is changed. The area A4 is changed in size and displayed by being linked to the drag operation of the size change mark M1 and the size thereof is changed in accordance with the position of the size change mark M1 after the drag operation. In the example shown in FIG. 6B, if the size change mark M1 at the lower right corner of the area A4 is moved by a drag operation, the size of the area A4 is changed to the size of an area A4' in accordance with the position of the size change mark M1 after the movement while the upper left corner of the area A4 is fixed.

If, as shown in FIG. 6C, the user specifies the angle change mark M2 in the area A4 and performs a drag operation, the rotation angle of the area A4 is changed. The area A4 is changed in rotation angle and displayed by being linked to the drag operation of the angle change mark M2 and the rotation angle thereof is changed in accordance with the position of the angle change mark M2 after the drag operation. In the example shown in FIG. 6C, if the size change mark M2 at the upper right corner of the area A4 is moved by a drag operation, the rotation angle of the area A4 is changed to the rotation angle of an area A4' in accordance with the position of the angle change mark M2 after the movement while the upper left corner of the area A4 is fixed.

The menu execution unit 103 changes setting conditions (the arrangement, size, and rotation angle) for the area A based on a drag operation of the area A to be edited or the change marks M1, M2. Though edit processing of the area A is also performed in a state in which the menu is scrolled or rotated, setting conditions for the area A are changed based on coordinates of the menu region. That is, setting conditions for the area A are changed after conversion of the position of the area A or the change marks M1, M2 after the drag operation on the display screen based on coordinates of the menu region. Then, changed setting conditions for the area A are held by the holding unit 107.

FIG. 7 is a diagram showing rearrangement processing of the area A. If the user instructs to rearrange the area A by a predetermined operation in area editing mode OM4, the area A is rearranged. In the rearrangement of the areas A, the areas A are rearranged in such a way that overlapping of the areas A is reduced.

In the example shown in FIG. 7A, the areas A1, A3 of clock and photo, the areas A2, A6 of mail and Web update, and the areas A4, A5 of movie and music are overlapped and visibility of the areas A2, A3, A4 displayed behind the areas A1, A5, A6 is reduced.

The menu execution unit 103 compares center positions (marked by •, ○ in FIG. 7) of the areas A and center positions (marked by X in FIG. 7) of sub-regions and changes setting conditions for the area A to rearrange the area A. Then, changed setting conditions are written into the holding unit 107. In this case, the menu region is divided into, for example, 3×3 grid-like subregions (i, j) and each area A is allocated to the center position of the corresponding subregion in accordance with the center position of the area A. The division number and the division shape of subregions are appropriately set in accordance with the number of areas A and the shape thereof.

As shown in FIG. 7A, the upper left subregion and the lower right subregion are defined as a subregion (1, 1) and a subregion (3, 3), respectively. The areas A1, A3 of clock and photo are arranged in the subregion (2, 2), the area A2 of mail is arranged in the subregion (2, 3), the area A6 of Web update is arranged in the subregion (3, 3), and the areas A4, A5 of movie and music are arranged in the subregion (2, 1). In the case of, for example, the areas A1, A3 of clock and photo, the center position of the area A1 of clock is closer to the subregion (2, 2) than the center position of the area A3 of photo. The center position of the other area A is not present in the subregion (1, 2) positioned to the left of the subregion (2, 2).

Thus, as shown in FIG. 7B, the center position of the area A1 of clock is rearranged to the center position of the subregion (2, 2) and the center position of the area A3 of photo is rearranged to the center position of the subregion (1, 2). Similarly, the center position of the area A2 of mail is rearranged to the center position of the subregion (1, 3), the center position of the area A4 of movie is rearranged to the center position of the subregion (1, 1), the center position of the area A5 of music is rearranged to the center position of the subregion (2, 1), and the center position of the area A6 of Web update is rearranged to the center position of the subregion (3, 3).

The menu execution unit 103 performs rearrangement processing of the areas A as described above, changes setting conditions (arrangement of the areas A) for the areas A, and writes changed setting conditions into the holding unit 107. Along with the rearrangement of the areas A, the size of the area A and/or the rotation angle thereof may be changed. Rearrangement processing of the area A may be performed in a state in which the menu region is not scrolled or rotated or in a state in which the menu region is scrolled or rotated.

[3-5. Launcher Mode OM5]

FIG. 8 is a diagram showing registration processing of an application. If a region corresponding to launcher buttons B3, B4 on the display screen of the menu is touched over a predetermined period by the finger O or the like, the operation mode is switched from the overall view mode OM1 to the launcher mode OM5 and applications can be registered. If a region outside the launcher L is touched by the finger O or the like over a predetermined period on the display screen in a state in which applications can be registered, the operation mode is switched from the launcher mode OM5 to the overall view mode OM1.

If the launcher button B3 or B4 at the left end and right end of the display screen is operated, the launcher L is displayed by overlapping with the menu in the upper region or the lower region. In the launcher L, icons I1 to I7, names and the like of applications that are not registered with the menu of applications that can be executed from the menu display apparatus 100 are displayed.

If a region corresponding to an icon I of an application on the display screen of the launcher L is touched over a predetermined period by the finger O or the like, the menu execution unit 103 switches the operation mode to the application execution mode OM3. Then, the application execution unit 105 activates the corresponding application. In the example shown in FIG. 8A, the icon I2 of scheduler is selected and thus, a scheduler is activated.

Figure 8B:
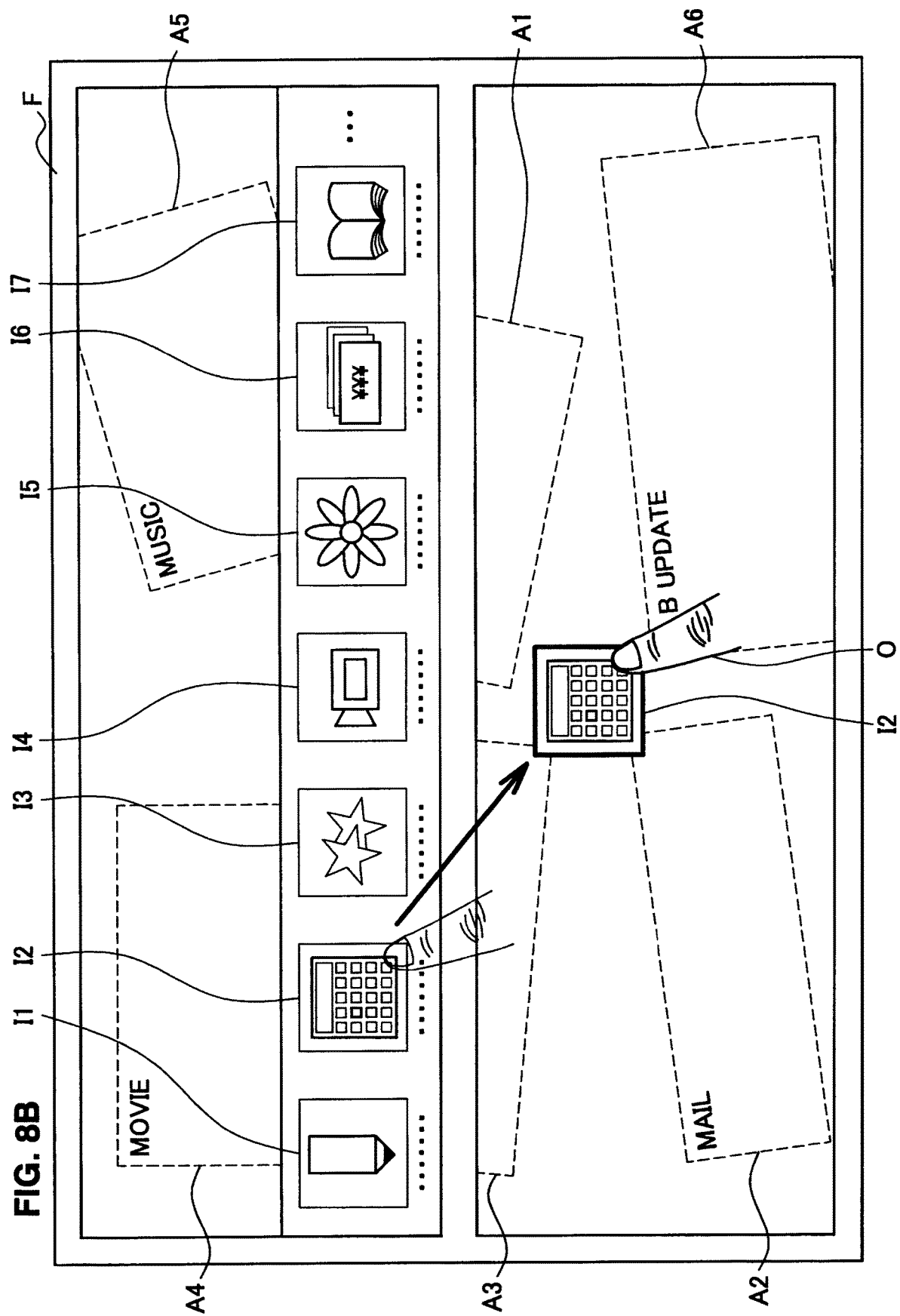
FIG. 8B is a diagram showing the registration processing of the application.

If the icon I of an application is specified and a drag and drop operation is performed from the region of the launcher L region to the menu region, the menu execution unit 103 updates registration information of the application. Also, the menu execution unit 103 adds the area A of the corresponding application to the menu in accordance with the drag and drop operation of the icon I. In the example shown in FIG. 8B, the drag and drop operation of the icon I2 of scheduler is performed and thus, the scheduler is registered with the menu. Then, as shown in FIG. 8C, an area A7 of the scheduler is added to the menu.

The arrangement of the added area A7 is set by using a drop position of the icon I2 as a reference and the size and rotation angle thereof are set as predetermined values. The area A7 becomes editable like in area editing mode and the change marks M1, M2 for changing the size and rotation angle are displayed in the area A7. Then, the arrangement, size, and rotation angle of the area A7 are changed in the same manner as in area editing mode OM4. When the edit processing of the area A7 is finished, the menu execution unit 103 writes setting conditions of the area A7 into the holding unit 107.

4. Hardware Configuration of Menu Display Apparatus 100

FIG. 9 is a block diagram showing a hardware configuration example of the menu display apparatus 100.

The menu display apparatus 100 mainly includes a CPU 901, a ROM 903, a RAM 905, a host bus 907, a bridge 909, an external bus 911, an interface 913, an input apparatus 915, an output apparatus 917, a storage apparatus 919, a drive 921, a connection port 923, and a communication apparatus 925.

The CPU 901 functions as an arithmetic processing unit or control apparatus and at least partially controls the operation of the menu display apparatus 100 according to various programs recorded in the ROM 903, the RAM 905, the storage apparatus 919, or a removable recording medium 927. The ROM 903 stores programs and parameters used by the CPU 901. The RAM 905 temporarily stores programs executed by the CPU 901 and parameters for program execution. The CPU 901, the ROM 903, and the RAM 905 are mutually connected by the host bus 907. The host bus 907 is connected to the external bus 911 via the bridge 909.

The input apparatus 915 is an operation unit that can be operated by the user such as a mouse, keyboard, touch panel, button, and switch. The input apparatus 915 may also be, for example, a remote operation unit using radio waves such as infrared rays or an external device 929 such as a mobile phone and PDA compatible with the operation of the menu display apparatus 100. The input apparatus 915 includes an input control circuit that generates an input signal based on operation information input by the user using, for example, the above operation unit and outputs the input signal to the CPU 901. The user of the menu display apparatus 100 inputs various kinds of data into the menu display apparatus 100 via the operation of the input apparatus 915 to instruct the processing operation.

The output apparatus 917 includes an apparatus capable of notifying the user of acquired information visually or auditorily, for example, a display apparatus such as a CRT display, liquid crystal display, and lamp, audio output apparatus such as a speaker and headphone, printer, mobile phone, and a fax machine. The output apparatus 917 outputs a processing result of the menu display apparatus 100. For example, the display apparatus displays a processing result by the menu display apparatus 100 as text information or image information and the audio output apparatus converts an audio signal of played-back audio data, acoustic data or the like into an analog signal for output.

The storage apparatus 919 is an apparatus for data storage and contains, for example, a magnetic storage device such as an HDD, semiconductor storage device, optical storage device, or magneto-optical device. The storage apparatus 919 stores programs executed by the CPU 901, various kinds of data, and various kinds of data acquired from outside.

The drive 921 is a reader writer for a recording medium and is embedded in the menu display apparatus 100 or externally attached thereto. The drive 921 reads recorded data from the removable recording medium 927 such as an installed magnetic disk, optical disk, and semiconductor memory and outputs the recorded data to the RAM 905 to write data to be recorded.

The connection port 923 is a port to directly connect the external device 929, for example, a USB port, SCSI port, or RS232C port to the menu display apparatus 100. The menu display apparatus 100 acquires/provides data from/to the external device 929 connected to the connection port 923 via the connection port 923.

The communication apparatus 925 is a communication interface composed of a communication device to connect to a communication network N. The communication apparatus 925 is, for example, a communication card for wire or wireless LANUSB, router for ADSL, or modem for communication. The communication apparatus 925 transmits/receives a signal to/from, for example, the Internet or another communication device in conformity to a predetermined protocol. The communication network N connected to the communication apparatus 925 is composed of a network connected by wire or wirelessly. The communication network N may be the Internet, a home LAN, infrared-ray communication, radio wave communication or satellite communication.

An example of the hardware configuration to realize the function of the menu display apparatus 100 according to an embodiment of the present invention has been described. Each structural element of the hardware may be configured by using general devices or by using devices specialized for the function of each structural element.

5. Conclusion

According to the menu display apparatus 100 according to an embodiment of the present invention, as described above, the display of content information C is controlled in each area A according to setting conditions for the area A set each application in the menu and display data of the content information C acquired from each application. Thus, menu specifications can now be set from the side of the application.

Accordingly, the user can enjoy using a good menu environment by setting menu specifications as desired through changes of content to be displayed in a menu and changes of display data. Application developers can also provide a good user environment to the user by setting menu specifications as desired.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

100 Menu display apparatus
101 Control unit
103 Menu execution unit
105 Application execution unit
107 Holding unit
111 Operation unit
113 Display controller
115 Display unit
117 Content recording unit
119 Communication unit

The invention claimed is:

1. An information processing apparatus comprising:
at least one processor configured to:
acquire, from each application of a plurality of applications, display data of content information representing content to be displayed in a menu of content managed by each application of the plurality of applications;
control display of the content information in each region of the menu according to setting conditions for a respective region provided for each respective application of the plurality of applications in the menu and the display data of the content information acquired from each application of the plurality of applications;
detect a user operation on a predetermined region of the menu of the content; and
control, based on the user operation, display of the content information displayed in the predetermined region and display of additional content information different from the content information displayed in the predetermined region.

2. The information processing apparatus according to claim 1,
wherein the user operation includes a pointing operation performed on the predetermined region over a predetermined period.

3. The information processing apparatus according to claim 2,
wherein, when the pointing operation is performed on the predetermined region over the predetermined period, an amount of the content information for displaying is a first amount, and
wherein, when the pointing operation is performed on the predetermined region under the predetermined period, the amount of the content information for displaying is a second amount being less than the first amount.

4. The information processing apparatus according to claim 2,
wherein, when the pointing operation is performed on the predetermined region over the predetermined period, the content information for displaying includes the menu and a sub-menu, and
wherein, when the pointing operation is performed on the predetermined region under the predetermined period, the content information for displaying includes only the menu.

5. The information processing apparatus according to claim 4, wherein, when a return to the menu is instructed in the sub-menu, the at least one processor is further configured to:
control a zoom-out display from the sub-menu to the menu.

6. The information processing apparatus according to claim 1, wherein the user operation is detected with a touch panel.

7. The information processing apparatus according to claim 1, wherein, when a drag operation is performed by specifying a region other than the region provided for each application of the plurality of applications, the at least one processor is further configured to:
control scroll and display of the menu by being linked to the drag operation.

8. The information processing apparatus according to claim 1, wherein the menu is rotated based on another user operation.

9. The information processing apparatus according to claim 8, wherein the another user operation corresponds to an operation of a focus moving button.

10. The information processing apparatus according to claim 1, wherein at least one application of the plurality of applications is executed based on another user operation.

11. The information processing apparatus according to claim 1, wherein, when a region caused to be focused in the menu is selected, the at least one processor is further configured to:
control display of a sub-menu of an application corresponding to the selected region and display content information in the sub-menu of the content managed by the application.

12. The information processing apparatus according to claim 11, wherein the at least one processor is further configured to:
make preparations for execution of the application; and
when the content information is selected from the sub-menu, provide activation parameters of the content corresponding to the selected content information to the application that processes the content.

13. The information processing apparatus according to claim 11, wherein, when a focus for the region is moved in the menu, the at least one processor is further configured to:
control a rotation display of a menu region so that a rotation angle of the region caused to be focused becomes 0° in accordance with the region caused to be focused by the focus moved in a spiral fashion with a center of the menu region set as a reference.

14. The information processing apparatus according to claim 11, wherein, when the region caused to be focused in the menu is selected, the at least one processor is further configured to:
control a zoom-in display of the sub-menu of the application corresponding to the selected region.

15. An information processing method comprising:
acquiring, from each application of a plurality of applications, display data of content information representing content to be displayed in a menu of content managed by each application of the plurality of applications;
displaying the content information in each region of the menu according to setting conditions for a respective region provided for each respective application of the plurality of applications in the menu and the display data of the content information acquired from each application of the plurality of applications;
detecting a user operation on a predetermined region of the menu of the content; and
displaying, based on the user operation, the content information displayed in the predetermined region and displaying, based on the user operation, additional content information different from the content information displayed in the predetermined region.

16. A non-transitory computer-readable medium having embodied thereon a program, which when executed by a computer causes the computer to execute a method, the method comprising:
acquiring, from each application of a plurality of applications, display data of content information representing content to be displayed in a menu of content managed by each application of the plurality of applications;
displaying the content information in each region of the menu according to setting conditions for a respective region provided for each respective application of the plurality of applications in the menu and the display data of the content information acquired from each application of the plurality of applications;
detecting a user operation on a predetermined region of the menu of the content; and
displaying, based on the user operation, the content information displayed in the predetermined region and displaying, based on the user operation, additional content information different from the content information displayed in the predetermined region.

17. The information processing apparatus according to claim 1, wherein the at least one processor is further configured to:
control display of the menu and a sub-menu based on the user operation.

18. The information processing apparatus according to claim 1, wherein the additional content information represents sub-content to be displayed in a sub-menu of sub-content managed by an application corresponding to the user operation.

* * * * *